(12) United States Patent
Erichsen et al.

(10) Patent No.: US 9,597,772 B2
(45) Date of Patent: *Mar. 21, 2017

(54) AUTOMATED DETERMINATION OF JET ORIENTATION PARAMETERS IN THREE-DIMENSIONAL FLUID JET CUTTING

(71) Applicant: Flow International Corporation, Kent, WA (US)

(72) Inventors: Glenn A. Erichsen, Everett, WA (US); Jiannan Zhou, Issaquah, WA (US); Dana Haukoos, Mount Dora, FL (US); Hyun Jung, Kent, WA (US)

(73) Assignee: Flow International Corporation, Kent, WA (US)

( * ) Notice: Subject to any disclaimer, the term of this patent is extended or adjusted under 35 U.S.C. 154(b) by 899 days.

This patent is subject to a terminal disclaimer.

(21) Appl. No.: 13/802,085

(22) Filed: Mar. 13, 2013

(65) Prior Publication Data
US 2013/0253687 A1     Sep. 26, 2013

Related U.S. Application Data

(63) Continuation of application No. 12/800,756, filed on May 21, 2010, now Pat. No. 8,423,172.

(51) Int. Cl.
*B24C 1/04*     (2006.01)
*G05B 15/02*    (2006.01)
(Continued)

(52) U.S. Cl.
CPC ............. *B24C 1/045* (2013.01); *B26D 5/00* (2013.01); *B26D 5/005* (2013.01); *B26F 3/004* (2013.01); *G05B 15/02* (2013.01); *Y10T 82/2585* (2015.01)

(58) Field of Classification Search
CPC .......... B24C 1/045; G05B 15/02; B26D 5/00; B26D 5/005; B26F 3/004; Y10T 82/2585
See application file for complete search history.

(56) References Cited

U.S. PATENT DOCUMENTS

| 5,643,058 | A  | * | 7/1997 | Erichsen | B24C 1/045 451/100 |
| 6,766,216 | B2 | * | 7/2004 | Erichsen | B24C 1/045 700/159 |

(Continued)

FOREIGN PATENT DOCUMENTS

| WO | 9510076 A1    | 4/1995 |
| WO | 2007019334 A1 | 2/2007 |

OTHER PUBLICATIONS

European Patent Office; International Search Report and Written Opinion for PCT/US2011/037418, filed May 20, 2011; Search Report and Written Opinion mailed on Sep. 21, 2011; 9 pages.

(Continued)

*Primary Examiner* — M. N. Von Buhr
(74) *Attorney, Agent, or Firm* — Ellen M. Bierman; Lowe Graham Jones PLLC

(57) ABSTRACT

Methods, systems, and techniques for automatically determining jet orientation parameters to correct for potential deviations in three dimensional part cutting are provided. Example embodiments provide an Adaptive Vector Control System (AVCS), which automatically determines speeds and orientation parameters of a cutting jet to attempt to insure that a part will be cut within prescribed tolerances where possible. In one embodiment, the AVCS determines the tilt and swivel of a cutting head by mathematical predictive models that examine the cutting front for each of "m" hypothetical layers in a desired part, to better predict whether the part will be within tolerances, and to determine (Continued)

what corrective angles are needed to correct for deviations due to drag, radial deflection, and/or taper.

23 Claims, 24 Drawing Sheets
(12 of 24 Drawing Sheet(s) Filed in Color)

(51) Int. Cl.
  *B26F 3/00* (2006.01)
  *B26D 5/00* (2006.01)

(56) References Cited

U.S. PATENT DOCUMENTS

| | | | |
|---|---|---|---|
| 6,922,605 B1 | 7/2005 | Olsen | |
| 6,996,452 B2* | 2/2006 | Erichsen | B24C 1/045 700/159 |
| 7,035,708 B1 | 4/2006 | Olsen | |
| 8,165,713 B2* | 4/2012 | Alberts | B24C 1/04 451/5 |
| 8,423,172 B2* | 4/2013 | Erichsen | B24C 1/045 451/102 |
| 8,428,768 B2* | 4/2013 | Bandini | G05B 19/40937 700/180 |
| 8,568,197 B2* | 10/2013 | Voice | B24C 1/00 451/11 |
| 2001/0022920 A1 | 9/2001 | Hyatt et al. | |
| 2003/0129032 A1 | 7/2003 | Hyatt et al. | |
| 2004/0186535 A1 | 9/2004 | Knowlton | |
| 2004/0210214 A1 | 10/2004 | Knowlton | |
| 2007/0037496 A1 | 2/2007 | Habermann et al. | |
| 2007/0283794 A1 | 12/2007 | Giannetti | |
| 2009/0071303 A1 | 3/2009 | Hashish et al. | |
| 2010/0003904 A1 | 1/2010 | Duescher | |

OTHER PUBLICATIONS

Andrej Lebar et al.; Simulation of Abrasive Water Jet Cutting Process: Part 1. Unit Event Approach; Institute of Physics Publishing Modelling and Simulation in Materials Science and Engineering 12; Sep. 16, 2004; pp. 1159-1170; 12 pages.

Henri Orbanic et al.; Simulation of Abrasive Water Jet Cutting Process: Part 2. Cellular Automata Approach; Institute of Physics Publishing Modelling and Simulation in Materials Science and Engineering 12; Sep. 16, 2004; pp. 1171-1184; 14 pages.

Jay Zeng et al.; Kerf Characterization in Abrasive Waterjet Cutting; 2009 American WJTA Conference and Expo Aug. 18-20, 2009; Paper 1-H; 20 pages.

* cited by examiner

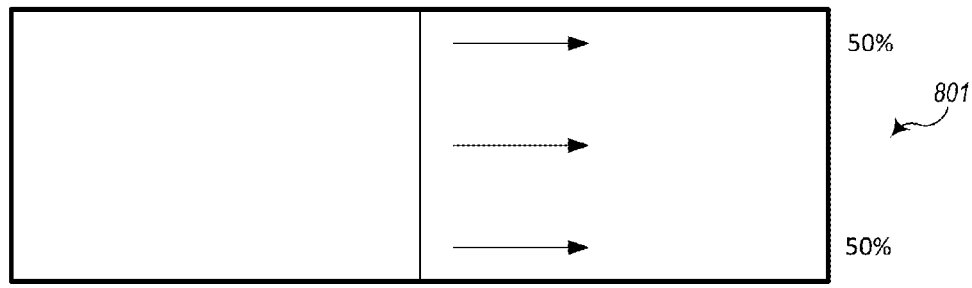
Fig. 8A  (Same Speed Top at Bottom)
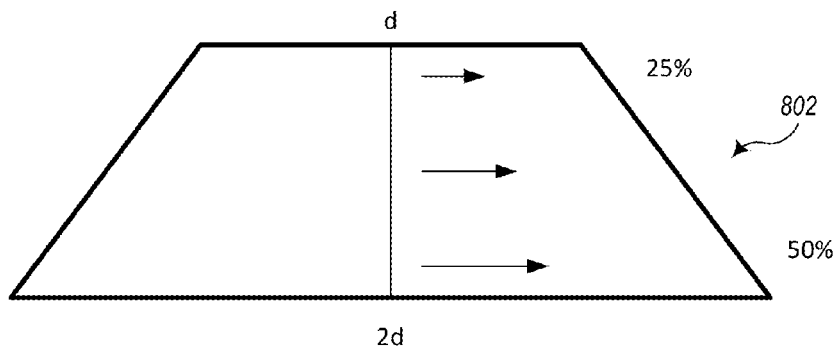
Fig. 8B  (Faster at Bottom)
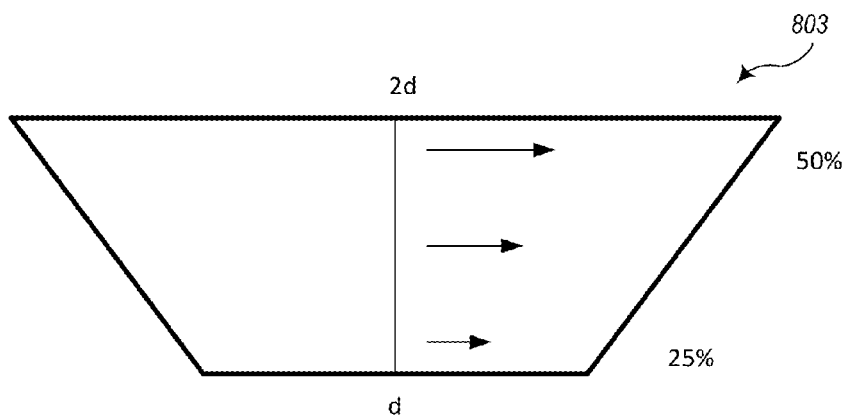
Fig. 8C  (Slower at Bottom)

AUTOMATED DETERMINATION OF JET ORIENTATION PARAMETERS IN THREE-DIMENSIONAL FLUID JET CUTTING

TECHNICAL FIELD

The present disclosure relates to methods, systems, and techniques for automatically controlling a fluid jet apparatus to cut three dimensional parts, and, in particular, to methods, systems, and techniques for automatically adjusting orientation parameters of a waterjet cutting apparatus to cut within a designated tolerance three dimensional parts having non-vertical surfaces and/or from non-flat material.

BACKGROUND

High-pressure fluid jets, including high-pressure abrasive waterjets, are used to cut a wide variety of materials in many different industries. Abrasive waterjets have proven to be especially useful in cutting difficult, thick, or aggregate materials, such as thick metal, glass, or ceramic materials. Systems for generating high-pressure abrasive waterjets are currently available, for example the Paser® ECL Plus system manufactured by Flow International Corporation. An abrasive jet cutting system of this type is shown and described in Flow's U.S. Pat. No. 5,643,058, which is incorporated herein by reference. The terms "high-pressure fluid jet" and "jet" used throughout should be understood to incorporate all types of high-pressure fluid jets, including but not limited to, high-pressure waterjets and high-pressure abrasive waterjets. In such systems, high-pressure fluid, typically water, flows through an orifice in a cutting head to form a high-pressure jet, into which abrasive particles are combined as the jet flows through a mixing tube. The high-pressure abrasive waterjet is discharged from the mixing tube and directed toward a workpiece to cut the workpiece along a designated path.

Various systems are currently available to move a high-pressure fluid jet along a designated path. Such systems are commonly referred to as three-axis and five-axis machines. Conventional three-axis machines mount the cutting head assembly in such a way that it can move along an x-y plane and perpendicular along a z-axis, namely toward and away from the workpiece. In this manner, the high-pressure fluid jet generated by the cutting head assembly is moved along the designated path in an x-y plane, and is raised and lowered relative to the workpiece, as may be desired. Conventional five-axis machines work in a similar manner but provide for movement about two additional rotary axes, typically about one horizontal axis and one vertical axis so as to achieve in combination with the other axes, degrees of tilt and swivel.

Manipulating a jet about five axes may be useful for a variety of reasons, for example, to cut a three-dimensional shape. Such manipulation may also be desired to correct for cutting characteristics of the jet or for the characteristics of the cutting result. More particularly, a cut produced by a jet, such as an abrasive waterjet, has characteristics that differ from cuts produced by more traditional machining processes. Two of the cut characteristics that may result from use of a high-pressure fluid jet are referred to as "taper" and "trailback." FIG. 1 is an example illustration of taper. Taper is a phenomenon resulting from the width of a jet changing from its entry into a material to its exit from the material. The taper angle refers to the angle of a plane of the cut wall relative to a vertical plane. Jet taper typically results in a target piece that has different dimensions on the top surface (where the jet enters the workpiece) than on the bottom surface (where the jet exits the workpiece). FIG. 2 is an example illustration of trailback. Trailback, also referred to as drag, identifies the phenomenon that the high-pressure fluid jet exits the workpiece at a point behind the point of entry of the jet into the workpiece, relative to the direction of travel. These two cut characteristics, namely taper and trailback, may or may not be acceptable, given the desired end product. Taper and trailback varies depending upon the speed the cut is made (the speed that the jet travels in order to produce separation of part of the material from another part) and other process parameters, such as material thickness. Thus, one known way to control excessive taper and/or trailback is to slow down the cutting speed of the system. In situations where it is desirable to minimize or eliminate taper and trailback, conventional five-axis systems have been used, primarily by manual trial and error, to apply angular corrections to the jet (by adjusting the cutting head apparatus) to compensate for taper and trailback as the jet moves along the cutting path.

BRIEF DESCRIPTION OF THE DRAWINGS

The patent or patent application file contains at least one drawing executed in color. Copies of this patent or patent application publication with color drawings will be provided by the Office upon request and payment of the necessary fee.

FIGS. 8A-8C illustrate an examples of assigning a 50% cutting speed to three parts with different side profiles.

DETAILED DESCRIPTION

Figure 1:
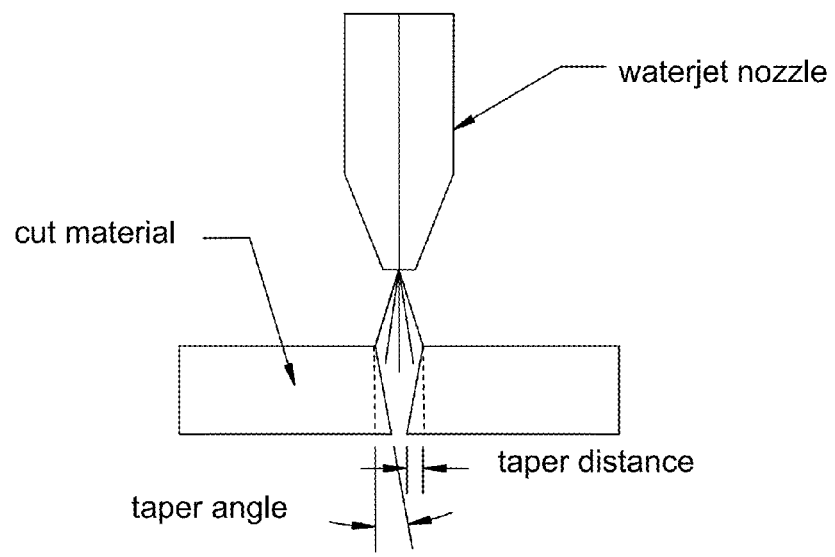
FIG. 1 is an example illustration of taper.
Figure 2:
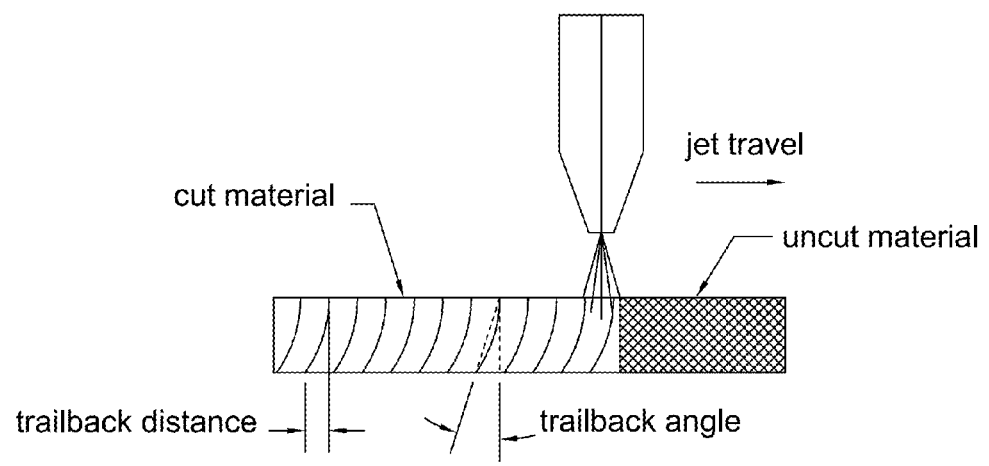
FIG. 2 is an example illustration of trailback.

Embodiments described herein provide enhanced computer- and network-based methods, systems, and techniques for automatically adjusting orientation of a jet in a waterjet cutting system to compensate for deviations to achieve superior control over the surface of the cut and resulting piece generated by the cut. Example embodiments provide an Adaptive Vector Control System ("AVCS") that automatically predicts how far the jet will deviate from the desired cutting path profile and automatically determines appropriate deviation correction angles that can be used to generate a motion control program or other data for controlling orientation of a cutting head apparatus. The deviation correction angles are determined as functions of the target piece geometry, as well as speed and/or other process parameters. By determining the deviation correction angles and using them, as appropriate, to generate instructions in the motion control program/data (in a form dependent upon what the cutting head controller can process), the AVCS enables the cutting head apparatus/controller to automatically control the three dimensional position and tilt and swivel of the cutting head and hence the x-axis, y-axis, z-axis and angular positions of the jet, relative to the material being cut, as it moves along a cutting path in three dimensional space to cut the target piece. The AVCS where possible maximizes cutting speed while still maintaining desired tolerances.

In one embodiment, the AVCS uses a set of advanced predictive models to determine the characteristics of an (intended) cut through a given material and to provide the deviation correction angles to account for predicted deviation of the jet from a straight-line trajectory. The predicted deviation may be related, for example, to the width of the jet changing as it penetrates through the material and/or the drag or deflection that results in the jet exiting at a point in some direction distant from the intended exit point. When cutting straight wall pieces, these cutting phenomena can be expressed as trailback/drag and taper and the corresponding deviation corrections expressed as lead compensation and taper compensation angles. However, when cutting more complicated pieces, such as non-vertical (beveled) surfaces, non-flat (curved) material, pieces with directional changes over the depth of the jet, pieces with different shapes on the top and on the bottom, etc. these deviations have directional components (such as forward, backward, and sideways terms relative to the direction and path of jet travel) that influence the deviations. The prediction of angular corrections thus becomes far more complex. Using advanced predictive models, the AVCS operates without manual (e.g., human) intervention and does not require special knowledge by the operator to run the cutting machine. The automatic nature of the AVCS thus supports decreased production time as well as more precise control over the cutting process, especially of complex parts.

Figure 3A:
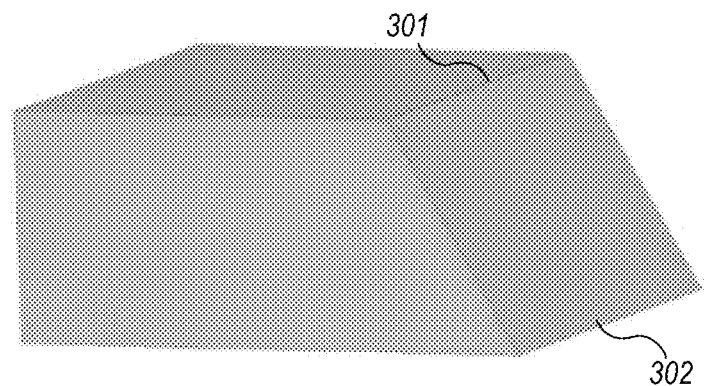
FIGS. 3A-3E show a variety of example shapes that can be automatically cut using the techniques of an example Adaptive Vector Control System.
Figure 3B:
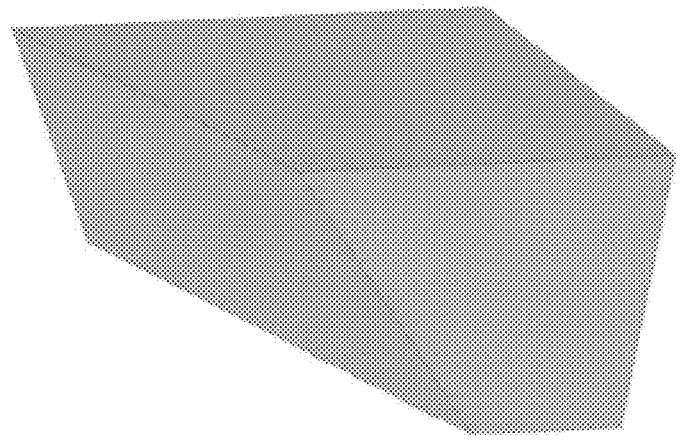
Figure 3C:
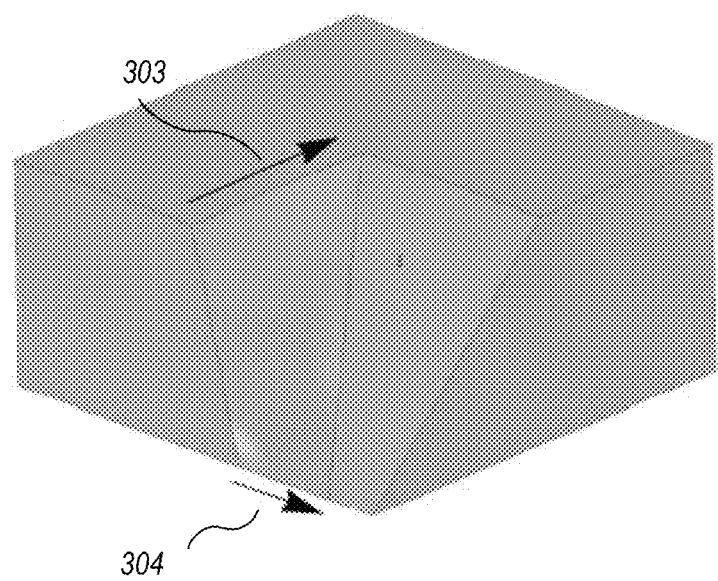
Figure 3D:
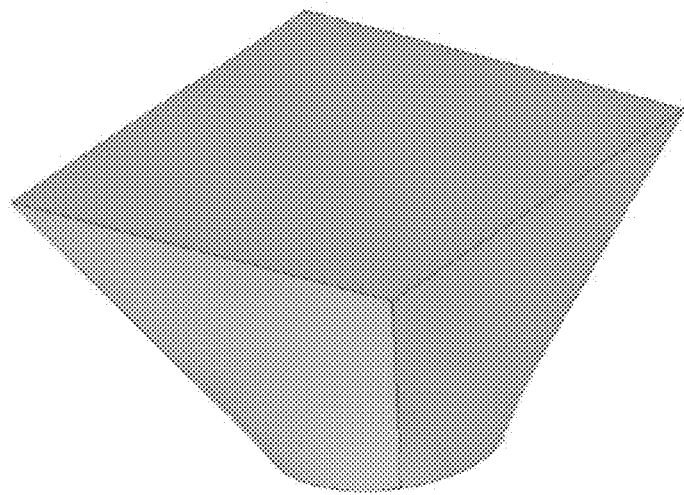
Figure 3E:
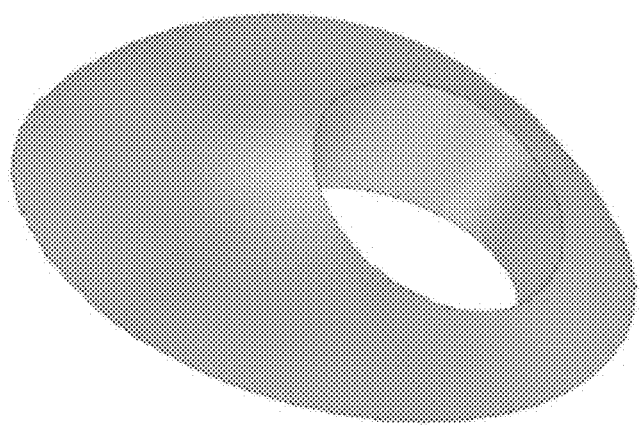

FIGS. 3A-3E show a variety of example shapes that can be automatically cut using the techniques of an example Adaptive Vector Control System. FIG. 3A illustrates a part with a simple bevel. In this case, the top and bottom of the part have the same shape but not the same size. As well, the lengths of the end bevel at the top of the part 301 and the end bevel at the bottom of the part 302 are the same. FIG. 3B illustrates a part with a tapered bevel. Here, the top and bottom look similar, but the lengths of the top and bottom are different. Thus, the cutting speeds at the top and bottom (where the jet enters and exits the part as it moves along the cutting path) are different because the top and bottom paths must be traversed in the same amount of time, but have different distances to travel. FIG. 3C illustrates a part that requires multi-directional cutting. Here, the cutting direction at the bottom of the part 304 is at right angles to the cutting direction at the top 303. Thus, the cut surface has a "twist" in it as a result of this action. Thus, the jet changes direction from where it enters the part to where it exits when it traverses the path identified by 303 and 304. FIG. 3D illustrates a part that has a top surface defined as a square and a bottom surface defined as a circle. When this part is cut, the part gradually changes from the square to the circle as the jet moves (i.e., penetrates the material) from the entrance of the jet (e.g., the top) to the exit of the jet (e.g., the bottom). FIG. 3E illustrates a part cut from a non-flat cutting surface. Here a portion of a sphere contains a hole.

In order to cut such parts, the AVCS employs the advanced predictive models to determine how the jet is affected when penetrating the material, from the entrance of the jet when making the cut (e.g., the top) to the exit of the jet when making the cut (e.g., the bottom), as it progresses along the intended cutting path. Of note, when cutting from flat stock material, the jet entry typically corresponds to a position on the top surface and the jet exit typically corresponds to a position on the bottom surface. As the jet progresses to cut the workpiece material to create the desired part, there is a path that forms a contour on the top, more generally referred to herein as the jet entry contour and a path that forms a contour on the bottom, more generally referred to herein as the jet exit contour. (A contour is a boundary of a shape or object.) One aspect to understand these models is to recognize that the cutting speed of the jet changes along the length (e.g., penetration or projection) of the jet as the jet advances along the cutting path profile. These microenvironment speed changes cause "localized" deflections along the length of the jet, which are accounted for by the models in determining deviation corrections.

Although discussed herein in terms of waterjets, and abrasive waterjets in particular, the described techniques can be applied to any type of fluid jet, generated by high pressure or low pressure, whether or not additives or abrasives are used. In addition, these techniques can be modified to control the x-axis, y-axis, z-offset, and tilt and swivel (or other comparable orientation) parameters as functions of process parameters other than speed, and the particulars described herein.

Figure 4:
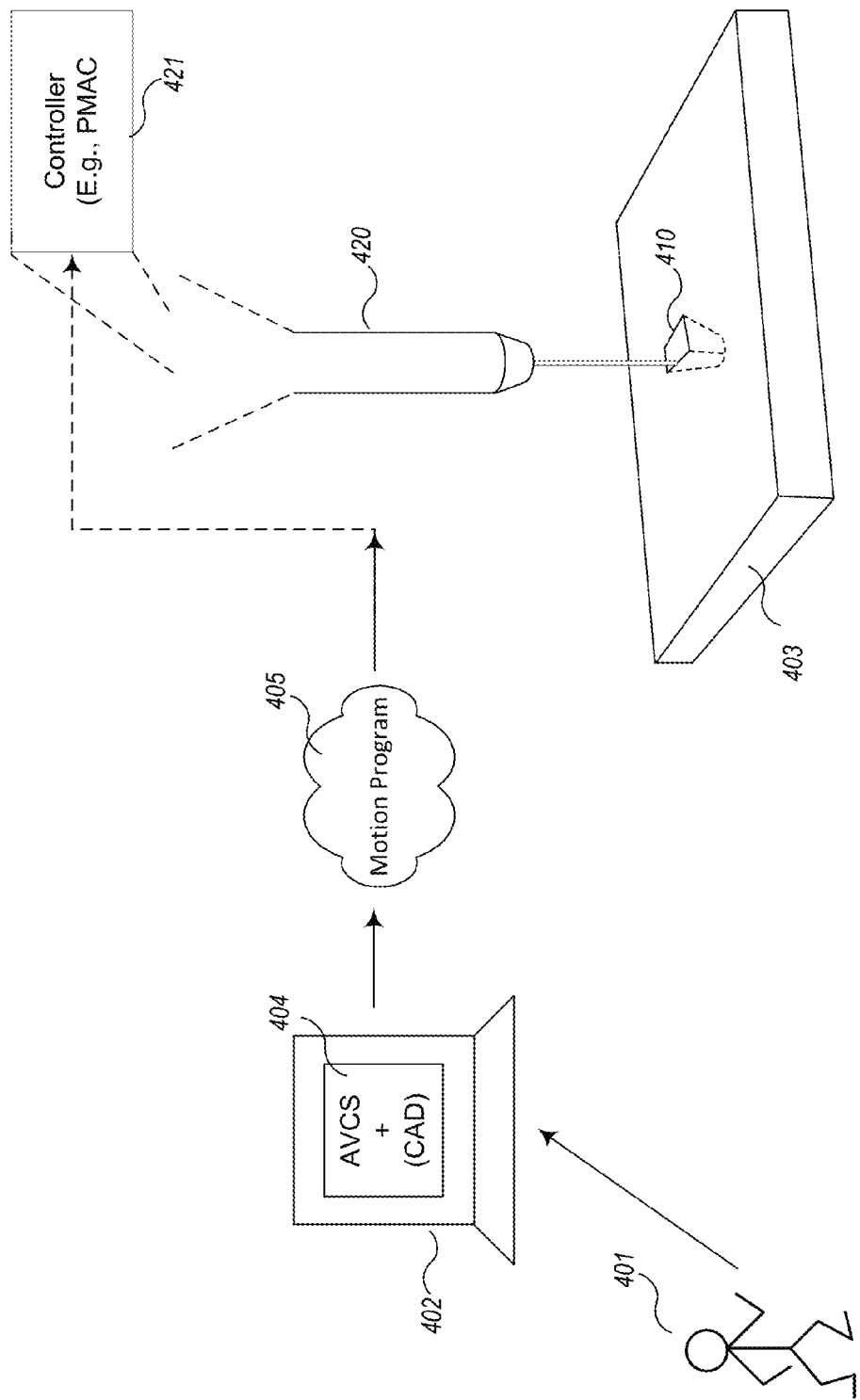
FIG. 4 is a block diagram illustrating the use of an Adaptive Vector Control System to produce a target piece.

FIG. 4 is a block diagram illustrating the use of an Adaptive Vector Control System to produce a target piece. In typical operation, an operator 401 uses a Computer-Aided Design ("CAD") program or package (or CAD/CAM program or package) at a computer workstation 402, to specify a design of a target piece 410 (e.g., a part) to be cut from the workpiece material 403. The computer workstation 402 is adjacent to or is remotely or directly connected to an abrasive water jet (AWJ) cutting apparatus 420, such as the high-pressure fluid jet apparatus called the "Dynamic Waterjet® XD" sold by Flow International Corporation. Other 4-axis, 5-axis, or greater axis machines can also be used providing that the "wrist" of the fluid jet apparatus allows sufficient (e.g., angular) motion. Any existing CAD program or package can be used to specify the design of target piece 410 providing it allows for the operations described herein. Further, the CAD design package also may be incorporated into the Adaptive Vector Control System itself. The generated design is then input into the AVCS 404, which then automatically generates, as discussed in further detail in the remaining figures, a motion program 405 (or other programmatic or other motion related data) that specifies how the jet apparatus 420 is to be controlled to cut the target piece 410 from the workpiece material 403. When specified by the operator, the AVCS 404 sends the motion program/data 405 to a hardware/software controller 421 (e.g., a Computer Numeric Controller, "CNC"), which directs the jet apparatus 420 to cut the workpiece material according to the instructions contained in the motion program/data 405 to produce the target piece 410. Used in this manner, the AVCS provides a Computer-Aided Manufacturing process (a "CAM") to produce target pieces.

Although the AVCS 404 described in FIG. 4 is shown residing on a computer workstation separate from, but connected to, the jet apparatus, the AVCS alternatively may be located on other devices within the overall jet system, depending upon the actual configuration of the jet apparatus and the computers or other controllers (the jet system). For example, the AVCS may be embedded in the controller of the jet apparatus itself (as part of the software/firmware/hardware associated with the machine). In this case, the motion program/data may be reduced and, rather, the determination of the automatic deviation correction adjustments to the jet orientation may be embedded into the controller code itself. Or, for example, the AVCS may reside on a computer system directly connected to the controller. In addition, the controller may take many forms including integrated circuit boards as well as robotics systems. All such combinations or permutations are contemplated, and appropriate modifications to the AVCS described, such as the specifics of the motion program/data and its form, are contemplated based upon the particulars of the fluid jet system and associated control hardware and software.

Figure 5:
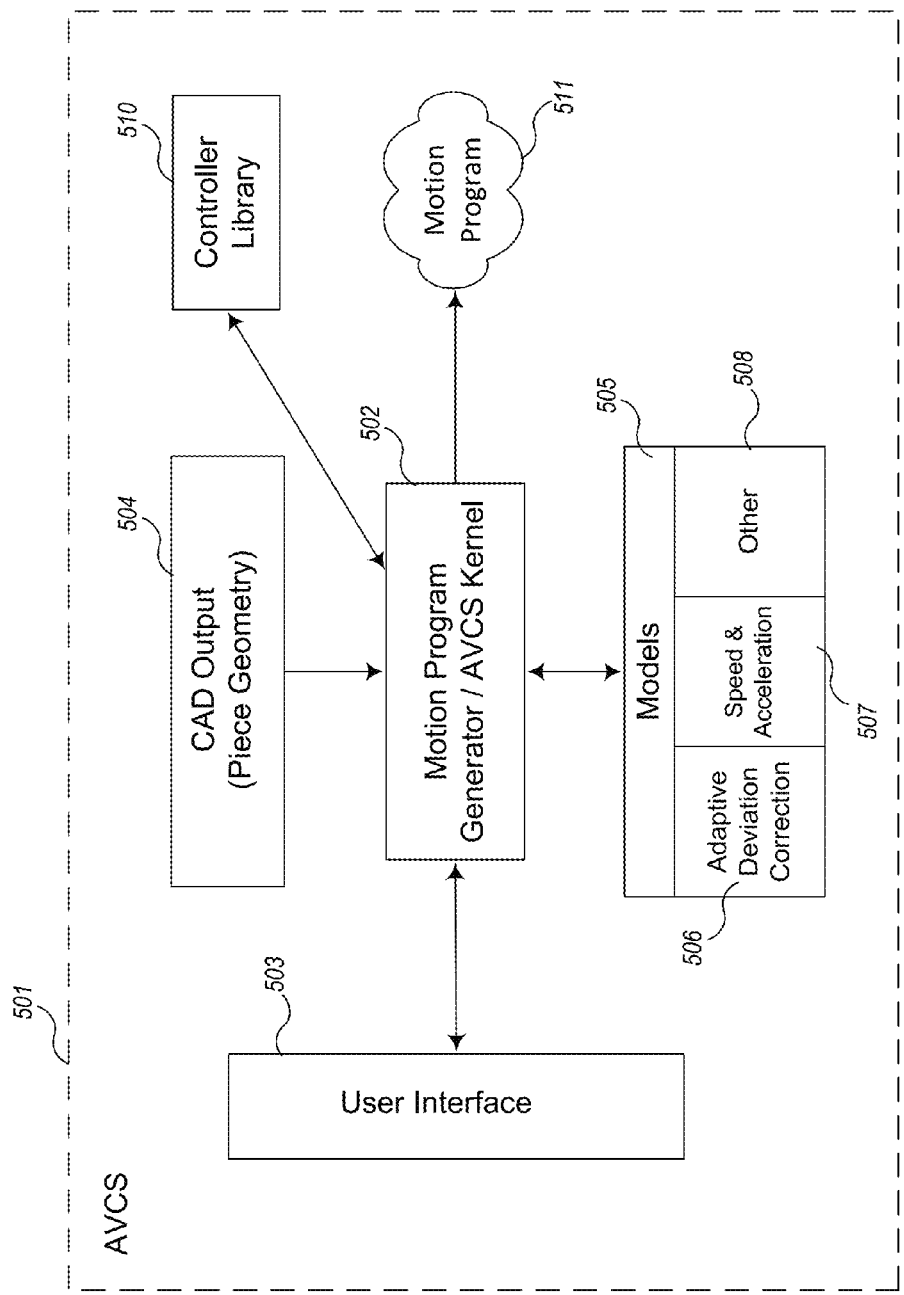
FIG. 5 is an example block diagram of components of an example embodiment of an Adaptive Vector Control System.

FIG. 5 is an example block diagram of components of an example embodiment of an Adaptive Vector Control System. In one embodiment, the AVCS comprises one or more functional components/modules that work together to provide a motion program/data to automatically control the tilt and swivel of the cutting head and other parameters that control the cutting head, and hence the x-axis, y-axis, and z-axis and angular positions of the jet relative to the material being cut, as the jet moves along a cutting path, in three dimensional space, to cut the target piece. These components may be implemented in software, firmware, or hardware or a combination thereof. The AVCS 501 comprises a motion program generator/kernel 502, a user interface 503, such as a graphical user interface ("GUI"), a CAD design module 504 (which may be external to the AVCS 501), one or more models 505, and an interface to the jet apparatus controller 510. The motion program generator 502 receives input from the CAD design module 504 and the user interface 503 to build up a motion program or comparable motion instructions or data that can be forwarded to and executed by the controller (the CNC) to control the jet. Alternative arrangements and combinations of these components are equally contemplated for use with techniques described herein. For example, the CAD design module 504 may be incorporated into the user interface 503. In one embodiment, the user interface 503 is intertwined with the motion program generator 502 so that the user interface 503 controls the program flow and generates the motion program and/or data. In another embodiment, the core program flow is segregated into a kernel module, which is separate from the motion program generator 502. The models 505 provide the motion program generator 502 with access to sets of mathematical models 506, 507, and 508 that are used to determine appropriate jet orientation and cutting process parameters. Each mathematical model 506, 507, and 508 comprises one or more sets of algorithms, equations, tables, or data that are used by the motion program generator 502 to generate particular values for the resultant commands in the motion program to produce desired cutting characteristics or behavior. For example, in a 5-axis machine environment, these algorithms/equations are used to generate the x-position, y-position, z-standoff compensation value, and deviation correction angles (for example, that are used to control the tilt and swivel positions of the cutting head) of each command if appropriate. The models 505 provide multiple mathematical models, typically in the form of software or other logic, that can be replaced without taking the machine off-line, for example in the form of "dynamic link libraries" (DLLs). In other embodiments they may be non-replaceable and compiled or linked into the AVCS code, for example, in the form of static linked libraries. Other architectures are equally contemplated. For example, in one embodiment, the models 505 include a set of algorithms, equations, tables, or data for generating deviation corrections 506; a set of equations for generating speed and acceleration values 507; and other models 508. The mathematical models 506, 507, and 508 are typically created experimentally and theoretically based upon empirical observations and prior analysis of cutting data. In particular, as will be discussed in further detail below, the adaptive deviation correction model 506 is an advanced predictive model that can be used to generate deviation correction angular values for an arbitrary shape—that is, one not previously "known" to the machine (one that the machine has not been specifically programmed a priori to cut). In one embodiment, the AVCS also comprises an interface to the controller (e.g., through a controller library 510), which provides functions for two way communication between the controller and the AVCS. These controller functions are used, for example, to display the cutting path in progress while the target piece is being cut out of the workpiece. They may also be used to obtain values of the cutting apparatus, such as the current state of the attached mechanical and electrical devices. In embodiments where the AVCS is embedded in the controller or in part of the cutting head apparatus, some of these components or functions may be eliminated.

Many different arrangements and divisions of functionality of the components of an AVCS are possible. In the following description, numerous specific details are set forth, such as data formats, user interface screens, code sequences, menu options, etc., in order to provide a thorough understanding of the described techniques. The embodiments described also can be practiced without some of the specific details, or with other specific details, such as changes with respect to the ordering of the code flow, different code flows, etc., or the specific features shown on the user interface screens. Thus, the scope of the techniques and/or functions described are not limited by the particular order, selection, or decomposition of blocks described with reference to any particular routine or code logic. In addition, example embodiments described herein provide applications, tools, data structures and other support to implement an AVCS for waterjet cutting. Other embodiments of the described techniques may be used for other purposes, including for other fluid jet apparatus cutting.

Figure 6:
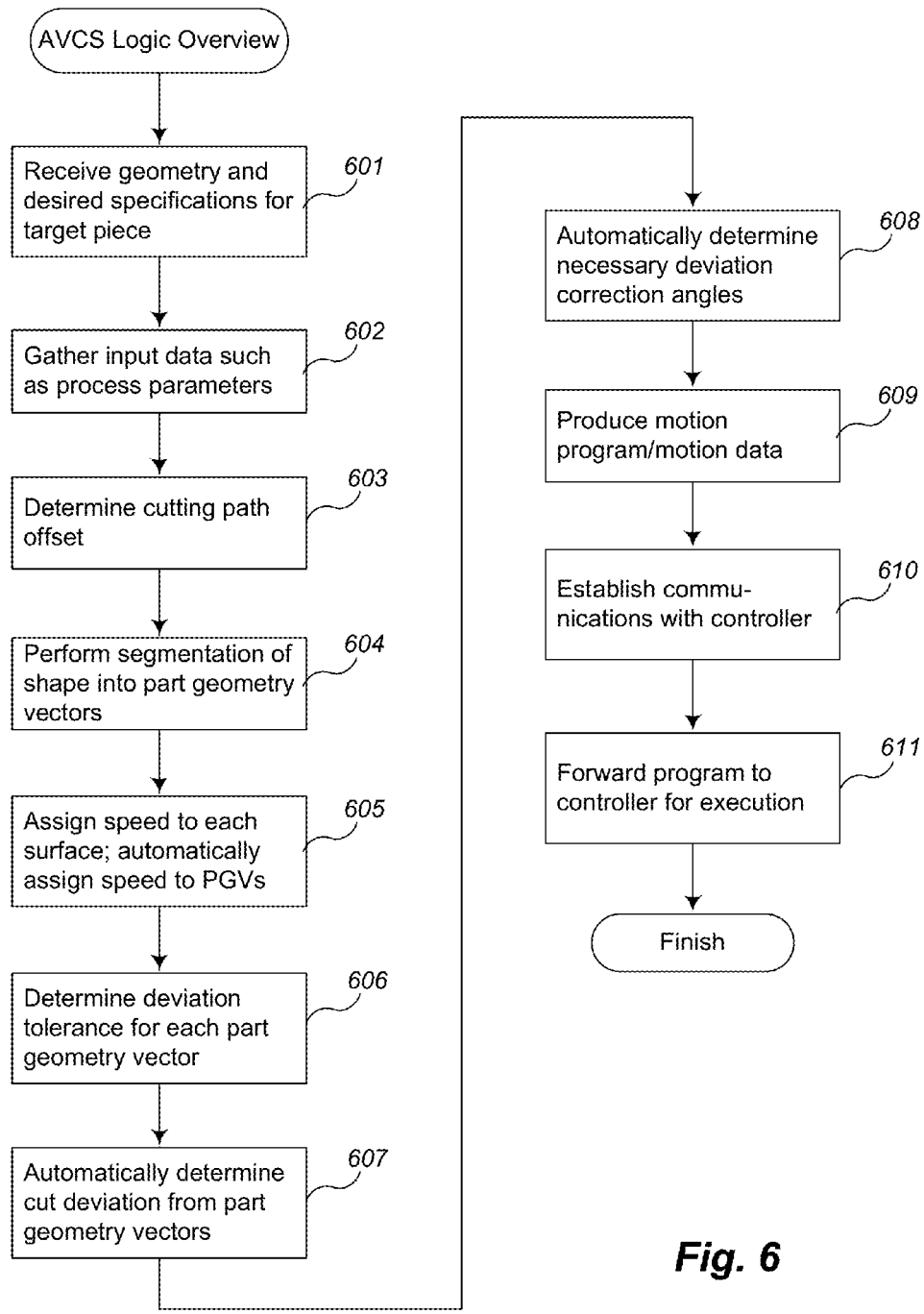
FIG. 6 is an example flow diagram of logic executed by an example embodiment of an Adaptive Vector Control System to produce a target piece.

FIG. 6 is an example flow diagram of logic executed by an example embodiment of an Adaptive Vector Control System to produce a target piece. In block 601, the AVCS gathers a variety of input data from the operator, such as from a CAD program running on workstation 402 in FIG. 4, including a design (a geometry specification) for a target piece in a three-dimensional CAD format, or equivalent. The geometry specification preferably describes a part formed by "ruled surfaces." A ruled surface is typically described by a set of points swept by a moving straight line. Since an unobstructed waterjet will proceed in a straight line, a ruled surface gives a natural way to define a part that may be produced. Generally speaking, a non-ruled surface is more difficult to cut by a waterjet process. However, cutting a non-ruled surface can be made to approximate the cutting of a ruled surface by viewing the cutting thereof as cutting a series of smaller ruled surfaces. The more subdivided the non-ruled surface into smaller ruled surfaces, the more likely the resultant shape will approximate the intended shape. For example, cutting a spherical surface can be approximated by cutting a multitude of smaller polygon flat surfaces; the more polygons cut, the more the resultant shape looks round. Also, it is possible to cut (remove) a ruled surface from a non-ruled workpiece, for example, such as that shown in FIG. 3E. In addition, other customer requirements can be specified and gathered, such as dimensional tolerances, and an indication of the surface finish (and/or desired quality and/or acceptable speed). In some embodiments, these input specifications may be supplied by a GUI, such as the user interface 503 of FIG. 5, by using tools that allow users to assign tolerances and/or indications of desired finish to particular regions of (areas and/or surfaces of) the target piece, for example, through standard or proprietary user interface controls such as buttons, edit fields, drop downs or a direct manipulation interface that incorporates drag-drop techniques. Dimensional tolerances may, for example, be indicated by a numerical input or some alternative scale. For example, scales that indicate relative accuracy can be used such as "tight tolerance" "standard tolerance," and "loose tolerance." Additionally, the whole part need not be assigned the same dimensional tolerance. For example, a mating surface may be defined as requiring higher precision than other less critical surfaces. Part tolerance is frequently traded off with surface finish with rougher surfaces creating less dimensionally accurate parts. In cases where the dimensional tolerance opposes the surface finish, the more stringent requirement of the two typically is used by the AVCS. For example, a part allowing a "loose tolerance" but a "fine finish" will be assigned the "fine finish" requirement. In addition, other indications of surface finish may be used such as a degree or a scale of desired quality and/or relative speed, where for example, 100% is equivalent to the fastest possible speed for that portion (e.g., a region of the part) and, for example, 50% is indicative of a finer finish. Other scales for indicating surface finish or the quality of the cut can be used, for example, indications of quality such as "rough finish," "medium finish," and "smooth finish." As well, default values may be supplied by the AVCS as well as a single value for the entire part.

In block 602, the AVCS gathers other input data, such as process parameters, typically from an operator, although these parameters may have default values or some may be able to be queried and obtained from the jet apparatus controller. In one example embodiment, the AVCS determines values for one or more of the type of material being cut; material thickness; fluid pressure; nozzle orifice diameter; abrasive flow rate; abrasive type; offset distance; mixing tube diameter; and mixing tube length (or other mixing tube characteristics) as process parameters.

In block 603, the AVCS uses the received geometry specification and input process parameters to automatically calculate an offset geometry. The offset geometry is the geometry that needs to be followed when the target piece is cut to account for any width that the jet actually takes up (the width of the cut/kerf due to the jet). This prevents the production of pieces that are smaller or larger than specified. As characteristics of the jet change over time, for example, due to wear, jet process parameters need to be correspondingly modified in order to compute the correct offset. In some embodiments, the size of the offset is fixed and part of the input data. Calculation of the offset geometry for a three-dimensional part may be achieved using known techniques for offsetting surfaces. Alternatively, an approximation of the offset geometry instead of direct calculation may be obtained by computing an offset from the jet entry contour (the contour of the part where the jet enters the material) and computing an offset from the jet exit contour (the contour of the part where the jet exits the material) and then connecting the entrance and exit contours by lines. Depending on the inclinations of the surfaces and allowed tolerances, this approximation methodology may or may not be acceptable.

Blocks 604-609 build up a motion program by incrementally storing determined program values in a motion program structure (or other data structure, as needed by a particular cutting head controller, cutting head, etc.). Preferably, the entries in the data structure correspond to stored motion program instructions and/or data that are executed by the controller. Depending upon the particular cutting head apparatus and controller, the motion program may be motion instructions and/or data, fed directly or indirectly to the hardware/software/firmware that controls the cutting head. In addition, some configurations require inverse kinematic data because the instructions are specified from the point of view of the motors in the cutting head instead of from the point of view of the jet. Inverse kinematics can be computed using known mathematics to convert jet coordinates into motor (or sometimes referred to as joint) commands. All such embodiments can be incorporated into an AVCS appropriately configured to use the techniques described herein.

In particular, in block 604, the offset geometry is segmented into a number of part geometry vectors (PGVs). This segmentation is performed, for example, automatically by components of the AVCS, or, in some embodiments, may be performed externally, such as by a CAD/CAM program.

Figure 7A:
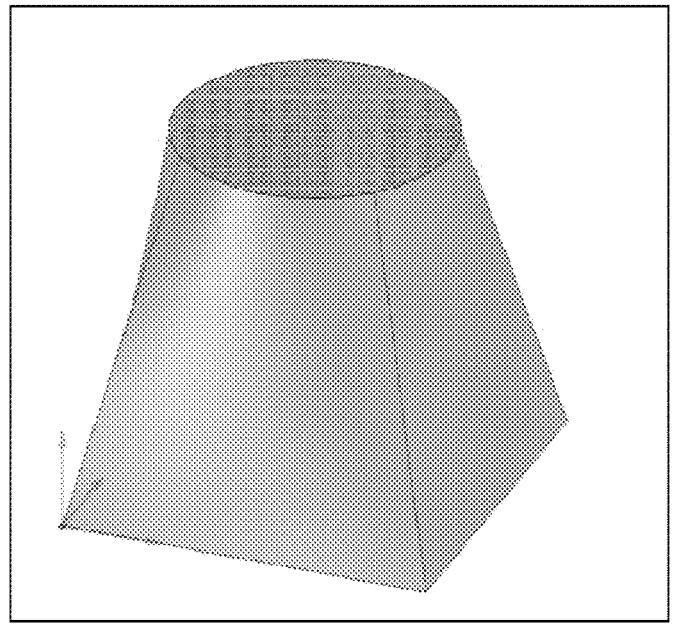
FIGS. 7A-7B show example segmentation of a desired part.
Figure 7B:
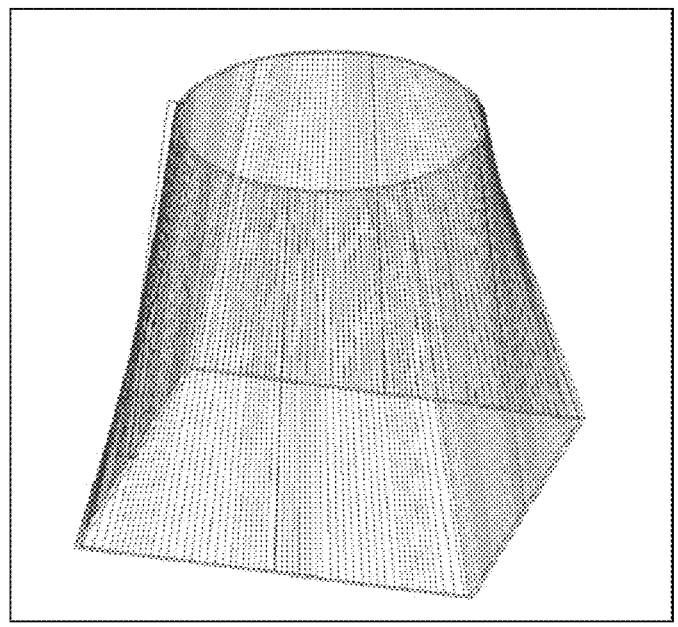

FIGS. 7A-7B show example segmentation of a desired part. FIG. 7A shows an example of a desired part (e.g., target piece design) as it might be rendered in a solid modeling CAD package. Information from the part geometry specification and offset geometry is used to determine the jet entrance contour where the cutting jet will enter the target material as it progresses along the desired cutting path, and the jet exit contour where the cutting jet will leave the material accordingly. For example, when cutting a part from flat stock, the jet entrance contour will define the cutting path on the top of the part and the jet exit contour will define the cutting path on the bottom of the part. The PGVs then are formed by using multiple lines to connect the jet entrance contour to the jet exit contour in a one to one relationship. That is, there are an equal number of segments between PGVs in both the entrance and exit contours. In one example embodiment, the end points of each PGV are connected by lines to each succeeding PGV along the contour. Thus, a circle or arc contour is converted into a sequence of line segments. FIG. 7B illustrates the part shown in 7A segmented into PGVs. In this example, the jet entrance contour forms a circle, and the jet exit contour forms a square. The ruled surface nature of the part is a clearly visible in FIG. 7B. In one embodiment, the number of PGVs is determined by the desired resolution of the target part to be cut. For example, the circular (entrance) contour shown in FIG. 7B requires a large number of PGVs to optimally retain its circular shape. If the segmentation process results in too few PGVs, then the desired circle would look like a polygon after it is cut. Other factors such as the hardware kinematics or motion controller capabilities may also be considered when determining the number of required PGVs. Additionally, lead-in and lead-out PGVs may be added to the offset geometry (or beforehand to the geometry specified by the user) to correspond to start and finishing positions of the jet. These vectors do not define the part, but describe the way the jet starts and ends its cut into the workpiece.

In block 605, an indication of maximum cutting speed allowed is assigned to one or more surfaces or regions of the desired part. Typically, the operator (or using a default provided by the AVCS) assigns a maximum speed to each region/surface of the target part, a set of regions, or the whole part, either as an indication of speed or by specifying surface finish and/or quality, etc. Defining the maximum speed allowed sets an upper limit on how rough the surface finish of the cut will be. Cutting speed and surface finish are tightly related; thus, the indication of maximum speed allowed may take the form of any scale representing cutting speed, surface finish, or cut quality. Using the input data, process parameters, received geometry specification, indication of speed, and any required mathematical relationships, the AVCS then automatically calculates the desired tool tip speed along the jet entrance contour for each segment (between PGVs) based upon the indicated maximum cutting speed assigned to each respective surface/ region. For example, if the operator had assigned a maximum cutting speed of 50% (½ speed) for the sides of the shape shown in FIG. 7B, then the AVCS would use that value to determine what actual cutting speed to assign to each entrance contour segment between PGVs (since the speed specified is the same for all). In the case where the length of a segment on the entrance contour and corresponding segment on the exit contour are different, the cutting speed will vary along the length (projection into the material) of the jet (because more material needs to be cut on one contour than the other in a given period of time). Thus, the AVCS needs to adjust the cutting speed at jet entrance such that no portion of a given surface is cut at a speed greater than the indicated maximum allowed speed. This means that the cutting speeds along some portions of the jet (hence assigned to the PGV) may be conservative to insure that all regions (surface areas) bounded by PGVs do not violate the quality requirement (e.g., are within the desired maximum speed). An example using a percent of maximum speed as a suitable indication of maximum speed is available in Flow-Master™ controlled shape cutting systems, currently manufactured by Flow International Corporation. Equivalent indicators of surface finish, speed, and/or quality are generally known. When using percent of maximum speed as the indicator, predictive models, equations, and/or equivalent look-up tables, such as the speed and acceleration model 507, can be used by the AVCS to determine the fastest cutting speed possible for a given thickness of material based on the input data (for example, to comport with Newtonian constraints). The percentage value is then used to scale the calculated maximum value.

FIGS. 8A-8C illustrate an examples of assigning a 50% cutting speed to three parts with different side profiles. In FIG. 8A, the side profile 801 indicates that the cutting jet will make a cut perpendicular to the top of the material. In this case, the cutting speed at the top will equal the cutting speed at the bottom and the AVCS simply assigns the desired 50% speed. In FIG. 8B, the side profile 802 indicates that bottom of the cut is twice as long as the top. This indicates that the jet will pivot during cutting with the result that the cutting speed at the bottom will be twice that at the top. In this case, the AVCS will adjust the cutting speed so that it is 50% at the bottom but only 25% at the top in order to preserve the desired surface finish/quality/speed. FIG. 8C shows the reverse case of FIG. 8B. Here, the jet at the bottom of the cut will be slowed down to 25% and at the top not allowed to exceed 50%. In all three cases the AVCS automatically determines the correct cutting speed based on input from the operator or defaults or other values assigned by the system. A conservative approach guarantees that the maximum cut speed at any point along the jet will not exceed the requested indication of speed.

In block 605, the determination of speed is made for each top/bottom pair of segments bounded by adjacent PGVs. Given the lengths of the top and bottom segments and an indication of speed, the AVCS can automatically calculate both the top and bottom cutting speeds.

Figure 9:
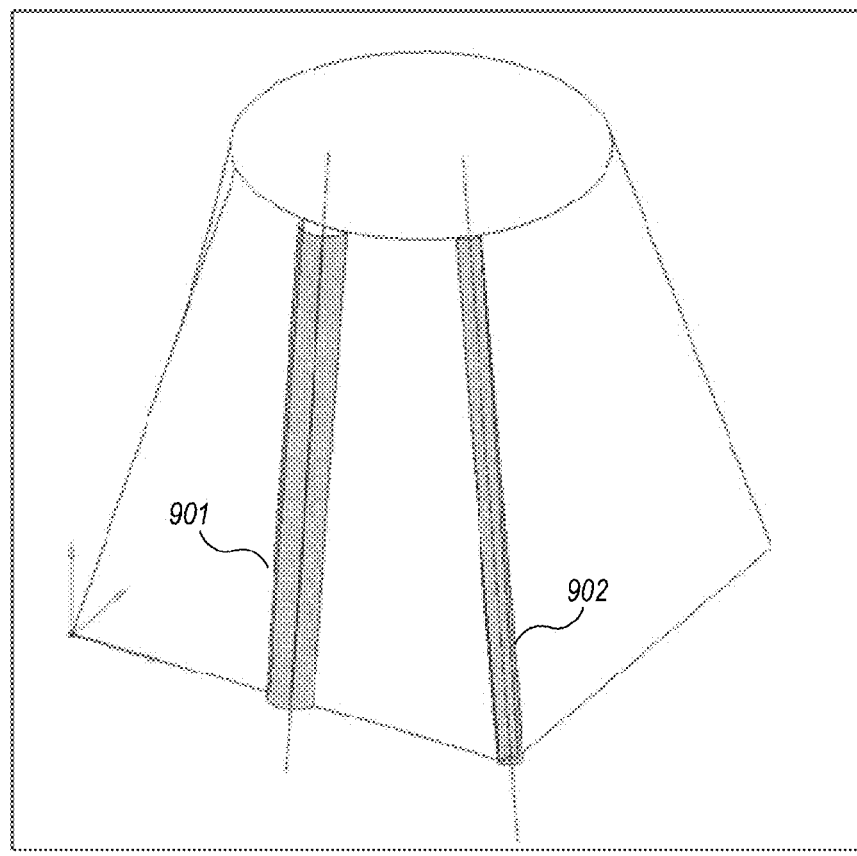
FIG. 9 is an example block diagram that illustrates two tolerance volumes around two part geometry vectors.

In block 606, the tolerance input data from block 601 are used to determine an enclosed (imaginary) volume around each PGV. This volume represents the deviation tolerance (or deviation tolerance zone) for each PGV. FIG. 9 is an example block diagram that illustrates two tolerance volumes around two part geometry vectors. In practice, a volume is defined around all PGVs, with FIG. 9 showing only two such vectors for the purpose of clarity. Volume 901 is a tolerance volume around a first PGV; volume 902 is a tolerance volume around a second PGV. As shown in FIG. 9, the volume around each vector need not be the same. For example, FIG. 9 shows a smaller volume 902 around the PGV at the corner of the part. This is indicative of a tighter tolerance requirement in this region of the part. Furthermore, while FIG. 9 shows a tolerance volume, for example, 901, that is cylindrical in shape, such a shape is not a requirement. In practice, the tolerance requirements may be directional in nature. For example, as the jet is directed into an inside corner, it may be undesirable to create a region of overcutting into the part. On an outside corner, however, cutting into the waste material by the trailing jet may be acceptable. These different requirements may result in one tolerance value as the jet goes into the corner and another tolerance value as the jet leaves the corner. Such requirements might create tolerance volumes of varying sizes and shapes throughout a part, unlike the cylindrical ones shown in FIG. 9. In addition, a single tolerance value may be assigned to the entire part, for example, when less precision of any subparts of the part is required. Also, one or more tolerances may be assigned by the cutting system, for example, as default values.

Figures 10, 11:
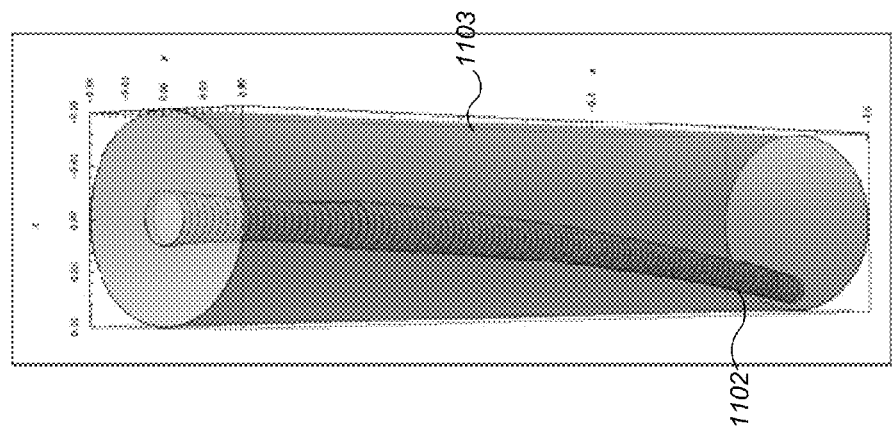
FIG. 10 illustrates a curved shape of a cutting front partially contained in a cylindrical shape of a deviation tolerance volume.
FIG. 11 illustrates an example of a curved shape where the predicted cutting front lies within the deviation tolerance volume.

In block 607, the AVCS automatically determines the shape of a the part to be cut and whether or not the shape is within the deviation tolerance associated with each PGV, for example, using the adaptive deviation correction model 506 in FIG. 5. In one embodiment, the indication of maximum allowed speed, input data, received geometry specification, and part geometry vectors are used to predict the shape of the cutting front (the cut down the length of the jet) as it moves into the workpiece material to cut the target piece. This prediction is discussed further below with respect to FIG. 19. Any suitable model giving the same or equivalent information may be used. The predicted shape of the cutting front is then compared to the deviation tolerance volume at each PGV. For example, FIG. 10 illustrates a curved shape of a cutting front partially contained in a cylindrical shape of a deviation tolerance volume. The curved shape 1002 represents the cutting front made into the workpiece material with the top of the shape centered upon a PGV (not shown). For ease of presentation, the cutting front is displayed as an assemblage of small cylinders, although only a half of each small cylinder may be needed to represent the cutting front. The cylinder 1003 represents the deviation tolerance volume surrounding the PGV. In FIG. 10, the cutting front representation falls outside of the deviation tolerance volume as can be seen by the tail of shape 1002 extending beyond cylinder 1003. FIG. 11 illustrates an example of a curved shape where the predicted cutting front lies within the deviation tolerance volume. Here, the curved shape 1102 is shown entirely within cylindrical shape 1103. The location and orientation of the cutting front within the deviation tolerance volume may change, but a critical factor is whether the cutting front is contained within the zone.

In block 608, the AVCS automatically determines two deviation correction angles applied relative to the XYZ-coordinate system used to describe the PGV. Here, the deviation correction angles are expressed spherical coordinates applied to the local coordinate system of the PGV. Other equivalent expressions may be used. Also, depending upon the cutting head apparatus motors and controller, fewer or more deviation angles may be determined and used. The deviation correction angles are used to create a new jet direction vector (JDV) that deviates from the PGV in the amount defined by the tilt and swivel specified in the deviation correction angles. In the case where the predicted shape of the cutting front is outside of the deviation tolerance volume, directing the jet along the JDV will adjust the cutting front into the deviation tolerance volume.

Figure 12:
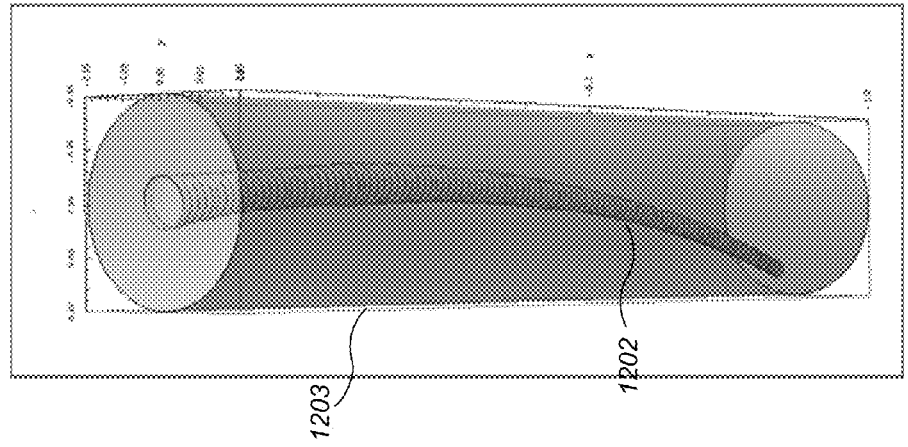
FIG. 12 illustrates an example of deviation correction angles applied to the representation shown in FIG. 10.

FIG. 12 illustrates an example of deviation correction angles applied to the representation shown in FIG. 10. Here, the cutting front 1202 is shown within the deviation tolerance volume defined by cylinder 1203. In cases where the deviation tolerance is small, or the curvature of the cutting front large, it may be impossible to find deviation correction angles that work as shown in FIG. 12.

Figure 13:
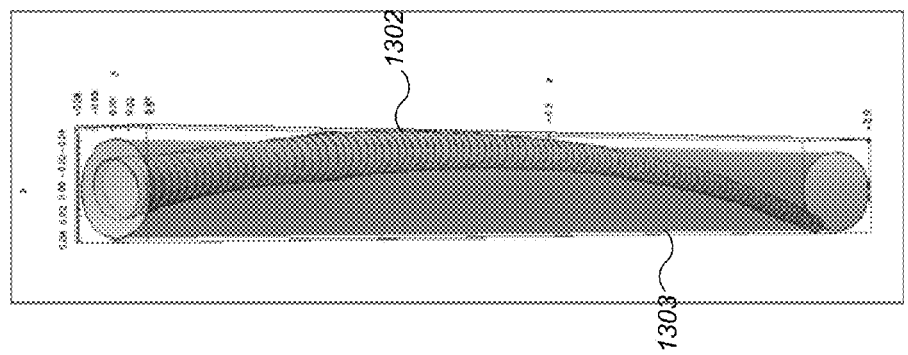
FIG. 13 illustrates an example where the predicted curvature of the cutting front cannot be oriented to be totally contained in a small deviation tolerance volume.

FIG. 13 illustrates an example where the predicted curvature of the cutting front cannot be oriented to be totally contained in a small deviation tolerance volume. Here cutting front 1302 extends beyond the deviation tolerance volume defined by cylinder 1303. When this phenomenon occurs, the AVCS automatically attempts to remove or reduce the curvature of the cutting front to meet the tolerance requirements established by the operator. Reducing the cutting speed has the effect of removing curvature in the cutting front.

Figure 14:
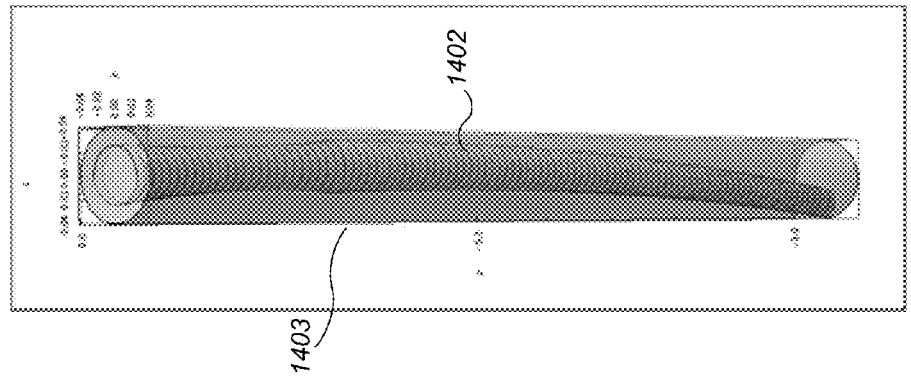
FIG. 14 illustrates a representation of the cutting front shown in FIG. 13 where the cutting speed has been reduced.

FIG. 14 illustrates a representation of the cutting front shown in FIG. 13 where the cutting speed has been reduced. Here, cutting front 1402 has a reduced curvature from cutting front 1302 shown in FIG. 13, now sufficient to fit within the deviation tolerance volume defined by cylinder 1403. If, after reducing the speed, the cutting front still cannot be adjusted to fit in the deviation tolerance volume, then, in one embodiment, a best fit is obtained and the operator alerted. Further, if a cutting speed reduction is required for one JDV, such a reduction may necessitate an adjustment in the cutting speeds of adjacent JDVs. These adjustments may be required to avoid introducing jerk into the cutting system. The determination of JDVs is discussed further below with respect to FIG. 19.

In block 609, the AVCS builds the final motion program/data by making adjustments to the motion program data structure (or other data structures) as necessary for the particular jet controller in use. The motion program contains the necessary commands to orient the jet along each JDV at the determined cutting speed, starting with the location of the lead-in JDV and ending with the location that corresponds to the lead-out JDV, as the jet progress along the entrance and exit contours. The motion program instructions may be expressed in terms of motor positions or tool-tip positions and orientations, or equivalents thereof. If tool-tip positions defining location and orientation are used, the controller must interpret the instructions into motor positions through the use of kinematic equations. The complexity of the kinematics are typically a function of the hardware used to manipulate the cutting jet.

For example, some controllers are capable of receiving motion programs specified in terms of the jet orientation and internally use inverse kinematics to determine the actual motor positions from the jet tool tip positions. Others, however, expect to receive the motion program instructions in terms of motor positions, and not jet tool tip x-y positions and angle coordinates. In this case, when the jet tool tip positions need to be "translated" to motor positions, the AVCS in step 609 performs such translations using kinematic equations and makes adjustments to the orientation parameter values stored in the motion program data structure.

In block 610, the AVCS establishes and/or verifies communication with the controller of the jet apparatus depending upon the setup of the connection between the AVCS and the controller. (For example, in the case of an embedded AVCS, this logic may not need to be performed.) In block 611, the AVCS sends (forwards, communicates, transmits, or the like) the built motion program/motion instructions/data to the controller for execution. The term "controller" includes any device/software/firmware capable of directing motor movement based upon the motion program/motion instructions/data. The term "motion program" is used herein to indicate a set of instructions that the particular jet apparatus and/or controller being used understands, as explained elsewhere. The foregoing code/logic can accordingly be altered to accommodate the needs of any such instructions and or data requirements.

Also, although certain terms are used primarily herein, other terms could be used interchangeably to yield equivalent embodiments and examples. In addition, terms may have alternate spellings which may or may not be explicitly mentioned, and all such variations of terms are intended to be included.

Figure 15:
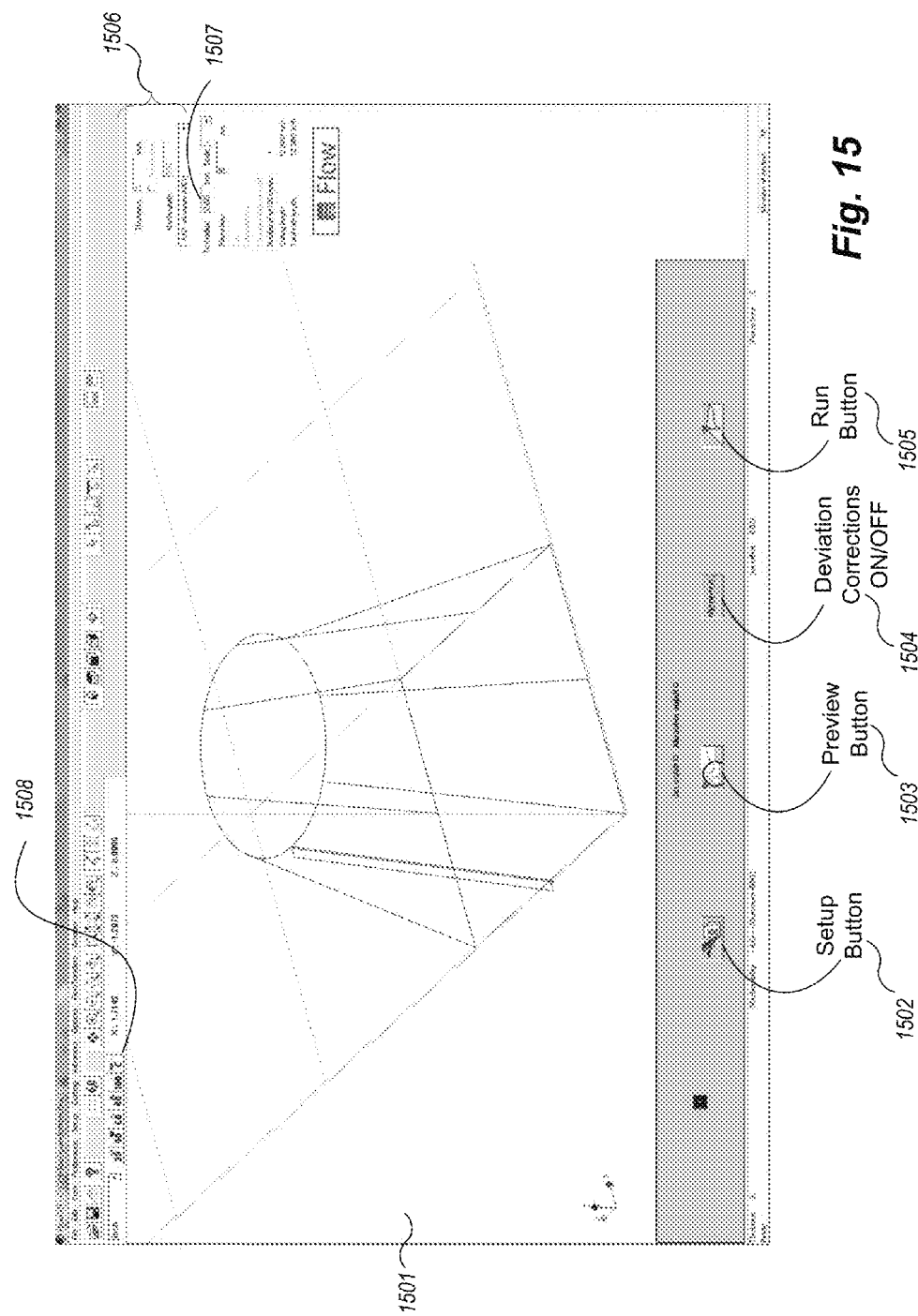
FIG. 15 is an example screen display of an introductory dialog of an example Adaptive Vector Control System cutting module user interface.
Figure 16:
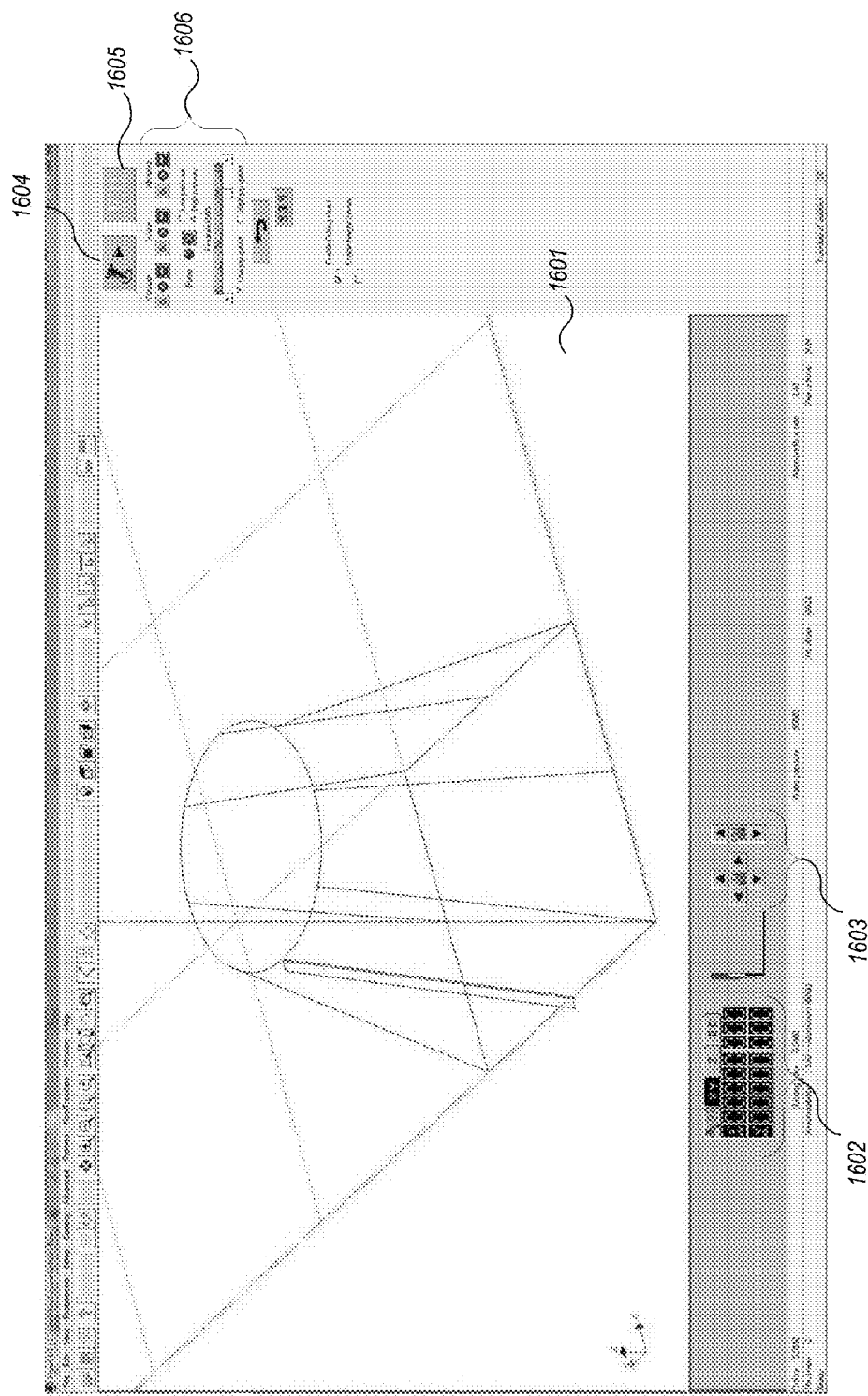
FIG. 16 is an example screen display of a jet controller feedback and control dialog of an example Adaptive Vector Control System cutting module user interface.

In one embodiment, the user interface of the AVCS is a graphical user interface ("GUI") that controls the entire cutting process. FIGS. 15 and 16 are example screen displays of various aspects of an example embodiment of the AVCS user interface. These displays show how a user invokes the AVCS capabilities to automatically determine jet deviation corrections and accordingly adjust the jet orientation as described in detail in FIGS. 19 and 26. Other example screen displays for entering user input, etc. are described in detail in U.S. Pat. No. 6,766,216, issued Jul. 20, 2004 to Flow International Corporation. Many variations of these screen displays, including the input requested, the output displayed, and the control flow exist and are contemplated to be used with the techniques described herein.

FIG. 15 is an example screen display of an introductory dialog of an example Adaptive Vector Control System cutting module user interface. Drawing display area 1501 contains a view of the current design of the target piece. In this particular embodiment, the lines are color coded to correspond to the customer surface finish requirements. Different accommodations (not shown) are made to represent two dimensional parts. Speed adjustment buttons 1508 can be used to manually change the settings for any particular drawing entity. Among other capabilities, the introductory dialog provides access to setup options via selection of the Setup button 1502. When the Preview button 1503 is selected, the AVCS provides a simulated preview of the direction and path of the cutting head along the drawing displayed in drawing display area 1501. The Deviations Corrections button 1504 is used to turn on the automatic orientation adjustments logic. When the Run button 1505 is selected, the AVCS performs a myriad of activities relating to building up the motion program, one embodiment of which is described in detail with respect to FIGS. 18 and 19. After the AVCS has finished building the motion program and establishing communication with the jet apparatus controller, the cutting module user interface displays the controller feedback and control dialog (the "controller dialog") for actually running the cutting process. The controller dialog is described with respect to FIG. 16. Other fields are available in the introductory dialog to set and display values of other process parameters. For example, attributes of the workpiece material can be set up in edit boxes 1506. Also, the radius of the jet tool can be set up in edit box 1507. The jet tool radius may be used to determine the offset of the jet that is needed to produce the target cutting path (the offset geometry).

FIG. 16 is an example screen display of a jet controller feedback and control dialog of an example Adaptive Vector Control System cutting module user interface. Cutting display area 1601 contains a view of the target part (here shown in three dimensions). Appropriate adjustments, not shown, are made to illustrate two dimensional cutting. The controller feedback and control dialog (controller dialog) presents current controller information to the operator as the target part is being cut. The orientation parameter feedback area 1602 displays the values of the orientation parameters from the controller's point of view. Once the cutting process is started, the operator can choose which parameters to display. The operator selects the home orientation buttons 1603 to set an (x,y,z) "origin" position and an "origin" for the tilt and swivel angular positions of the cutting head. Alternatively, the home orientation buttons 1603 may also be used to command the cutting head to travel to the home origin position if movement away from the location has occurred. Process parameter control area 1606 contains current values for pump and nozzle related parameters including whether or not abrasive is being used and whether the pump is performing at high or low pressure. To begin the actual cutting process, the operator selects the cycle start button 1604. At this time, the AVCS communicates the motion program to the controller and instructs the controller to execute the program. The cycle stop button 1605 is selected to stop the current cutting process.

Figure 17:
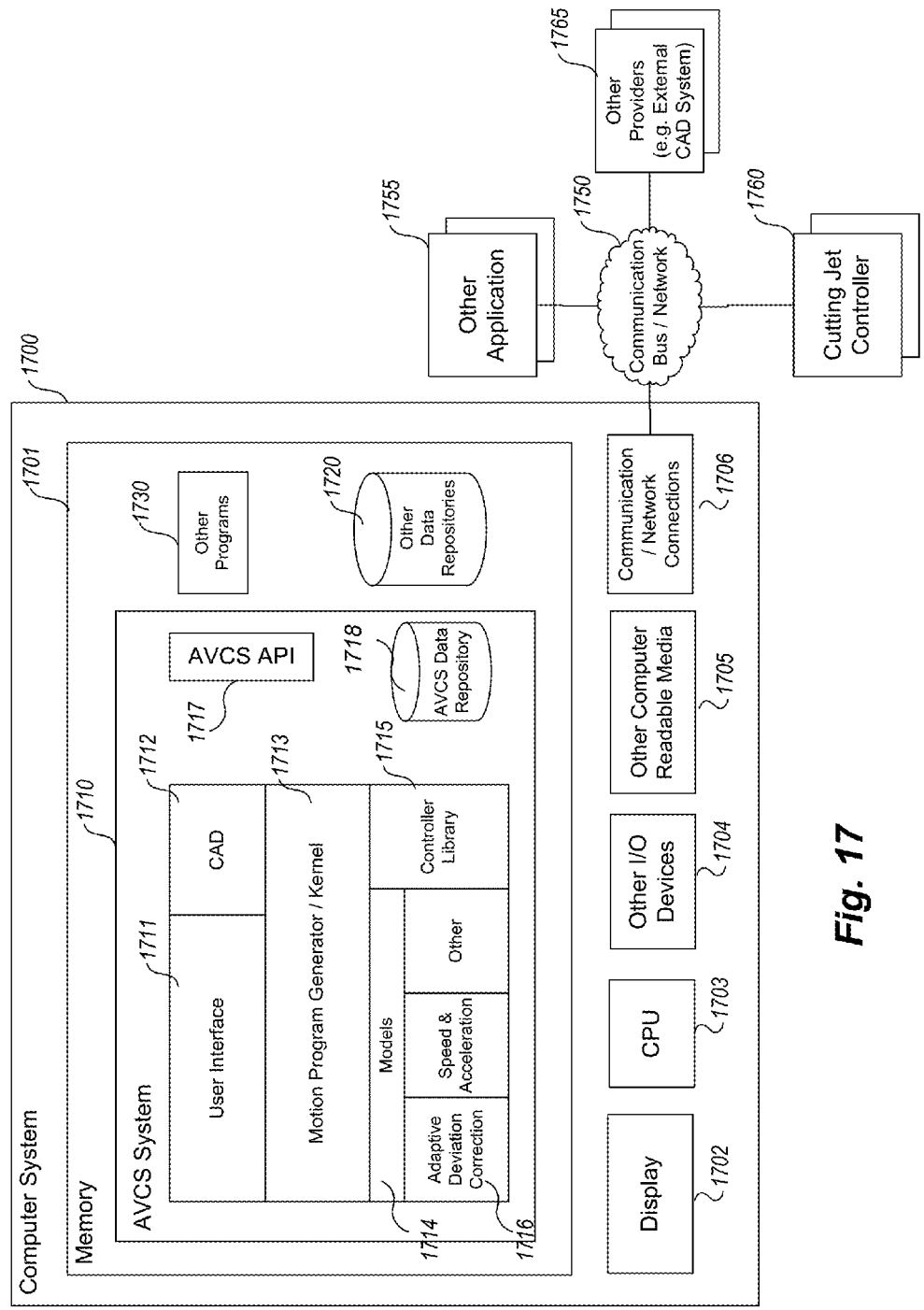
FIG. 17 is an example block diagram of an example computing system that may be used to practice embodiments of an Adaptive Vector Control System as described herein.

FIG. 17 is an example block diagram of an example computing system that may be used to practice embodiments of an Adaptive Vector Control System as described herein. Note that a general purpose or a special purpose computing system suitably instructed may be used to implement an AVCS. Further, the AVCS may be implemented in software, hardware, firmware, or in some combination to achieve the capabilities described herein.

The computing system 1700 may comprise one or more server and/or client computing systems and may span distributed locations. In addition, each block shown may represent one or more such blocks as appropriate to a specific embodiment or may be combined with other blocks. Moreover, the various blocks of the Adaptive Vector Control System 1710 may physically reside on one or more machines, which use standard (e.g., TCP/IP) or proprietary interprocess communication mechanisms to communicate with each other.

In the embodiment shown, computer system 1700 comprises a computer memory ("memory") 1701, a display 1702, one or more Central Processing Units ("CPU") 1703, Input/Output devices 1704 (e.g., keyboard, mouse, CRT or LCD display, etc.), other computer-readable media 1705, and one or more network or other communications connections 1706. The AVCS 1710 is shown residing in memory 1701. In other embodiments, some portion of the contents, some of, or all of the components of the AVCS 1710 may be stored on and/or transmitted over the other computer-readable media 1705. The components of the Adaptive Vector Control System 1710 preferably execute on one or more CPUs 1703 and manage the generation of motion programs, as described herein. Other code or programs 1730 and potentially other data repositories, such as data repository 1720, also reside in the memory 1701, and preferably execute on one or more CPUs 1703. Of note, one or more of the components in FIG. 17 may not be present in any specific implementation. For example, some embodiments embedded in other software may not provide means for user input or display.

As described in FIG. 5, in a typical embodiment the AVCS_1710 comprises various components, including a user interface 1711, a CAD module 1712 (if not a part of the user interface 1711), a motion program generator/AVCS Kernel 1713, one or more replaceable models 1714, including the Adaptive Deviation Correction Model 1716, a controller interface 1715, and an AVCS Data Repository 1718. These components are shown residing in the memory 1701. As described elsewhere, the user interface 1711 is used to provide the AVCS with certain inputs, such as a desired surface finish and/or other input parameters. The CAD module 1712 provides a geometry specification for the desired part. The Motion Program Generator/AVCS Kernel is responsible for segmenting the part geometry, determining tolerances and deviation corrections to achieve such tolerances using the models 1714, including the Adaptive Deviation Correction Model 1716. The AVCS Data Repository

1718 may be used to hold temporary or permanent data, including, for example, a copy of the generated motion program.

In at least some embodiments, the CAD module/component 1712 is provided external to the AVCS and is available, potentially, over one or more networks and/or communication buses 1750. Other and/or different modules may be implemented. In addition, the AVCS may interact via a communications bus/network 1750 with other application code 1755 that (e.g., for example that uses results computed by the AVCS 1710), one or more cutting jet controllers or control systems 1760, and/or one or more third-party information provider systems 1765, such as an External CAD System that provides part of the segmentation process or a 3D modeling tool, etc.

Also, in some embodiments, an AVCS API (Application Programming Interface)1717 is provided to provide programmatic access to aspects of the AVCS. For example, the API 1717 may provide programmatic access to the motion program stored in the data repository 1718, or even to the intermediary deviation correction results, such as the PGVs, JDVs, etc., or to the functions provided by the AVCS, in embodiments where such access is desirable. Such access may be desirable, for example, to interface to $3^{rd}$ party 3D modeling software.

In an example embodiment, components/modules of the AVCS 1710 are implemented using standard programming techniques. However, a range of programming languages known in the art may be employed for implementing such example embodiments, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The embodiments described above may also use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicating using message passing techniques. Equivalent synchronous embodiments are also supported.

In addition, programming interfaces to the data stored as part of the AVCS 1710 (e.g., in the data repositories 1718) can be available by standard means such as through C, C++, C#, and Java APIs; libraries for accessing files, databases, or other data repositories; through scripting languages such as XML; or through Web servers, FTP servers, or other types of servers providing access to stored data. The AVCS data repository 1718 may be implemented as one or more database systems, file systems, in-memory data structures, or any other method known in the art for storing such information, or any combination of the above, including implementation using distributed computing techniques.

Also the example AVCS 1710 may be implemented in a distributed environment comprising multiple, even heterogeneous, computer systems and networks. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) etc. Other variations are possible. Also, other functionality could be provided by each component/module, or existing functionality could be distributed amongst the components/modules in different ways, yet still achieve the functions described herein.

Furthermore, in some embodiments, some or all of the components of the AVCS 1710 may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), digital signal processors (DSPs), field-programmable gate arrays (FPGAs), complex programmable logic devices (CPLDs), etc. Some or all of the system components and/or data structures may also be stored (e.g., as executable or other machine readable software instructions or structured data) on a computer-readable medium (e.g., a hard disk; a memory; a network; or a portable media article to be read by an appropriate drive or via an appropriate connection) so as to enable or configure the computer readable medium and/or one or more associated computing systems or devices to execute or otherwise use or provide the contents to perform at least some of the described techniques. Some or all of the system components and data structures may also be stored as data signals (e.g., as part of a carrier wave or included as part of an analog or digital propagated signal) on a variety of computer-readable transmission mediums, such as media 1705, including wireless-based and wired/cable-based mediums, which signals are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

As discussed with reference to the user interface demonstrated in FIG. 15, when an operator selects the "Run" button from the introductory dialog of the cutting module of the user interface (see e.g., button 1505), the AVCS begins the process of automatically determining and adjusting deviation correction angles and building a motion program based upon them.

Figure 18:
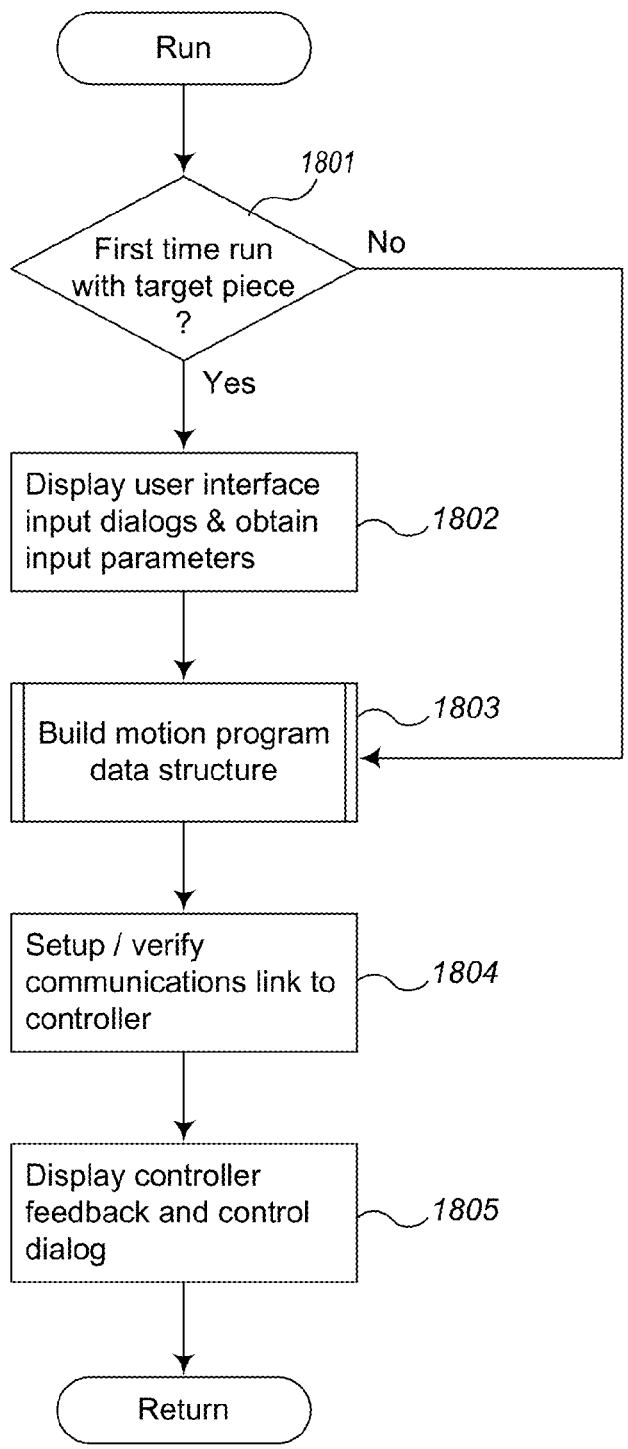
FIG. 18 is an example flow diagram of the automated deviation correction adjustment process of an example Adaptive Vector Control System.

FIG. 18 is an example flow diagram of the automated deviation correction adjustment process of an example Adaptive Vector Control System. In block 1801, the AVCS determines whether this is the first time that the software has been run to cut this target part or if any input (process) parameters have changed, and, if so, continues in block 1802, else continues in block 1803. In block 1802, the AVCS displays the user interface input dialogs and obtains information from the operator regarding what overriding values the operator desires, desired surface finish, desired tolerances, etc. In block 1803, the AVCS invokes a routine to build a motion program data structure (or equivalent data structure to hold motion instructions and/or data) using the automatic adjustment techniques described above to generate tilt and swivel angular values (based upon deviation corrections) and other process parameter values. In block 1804, the AVCS sets up or verifies that a communication session has been established with the jet controller. (This logic may not exist when using an AVCS embedded within a controller.) In block 1805, in one embodiment the AVCS displays a dialog to show feedback from the controller (for example, to show current x, y, z, and angular values while a part is being cut), and returns to await further operator instruction.

Figure 19:
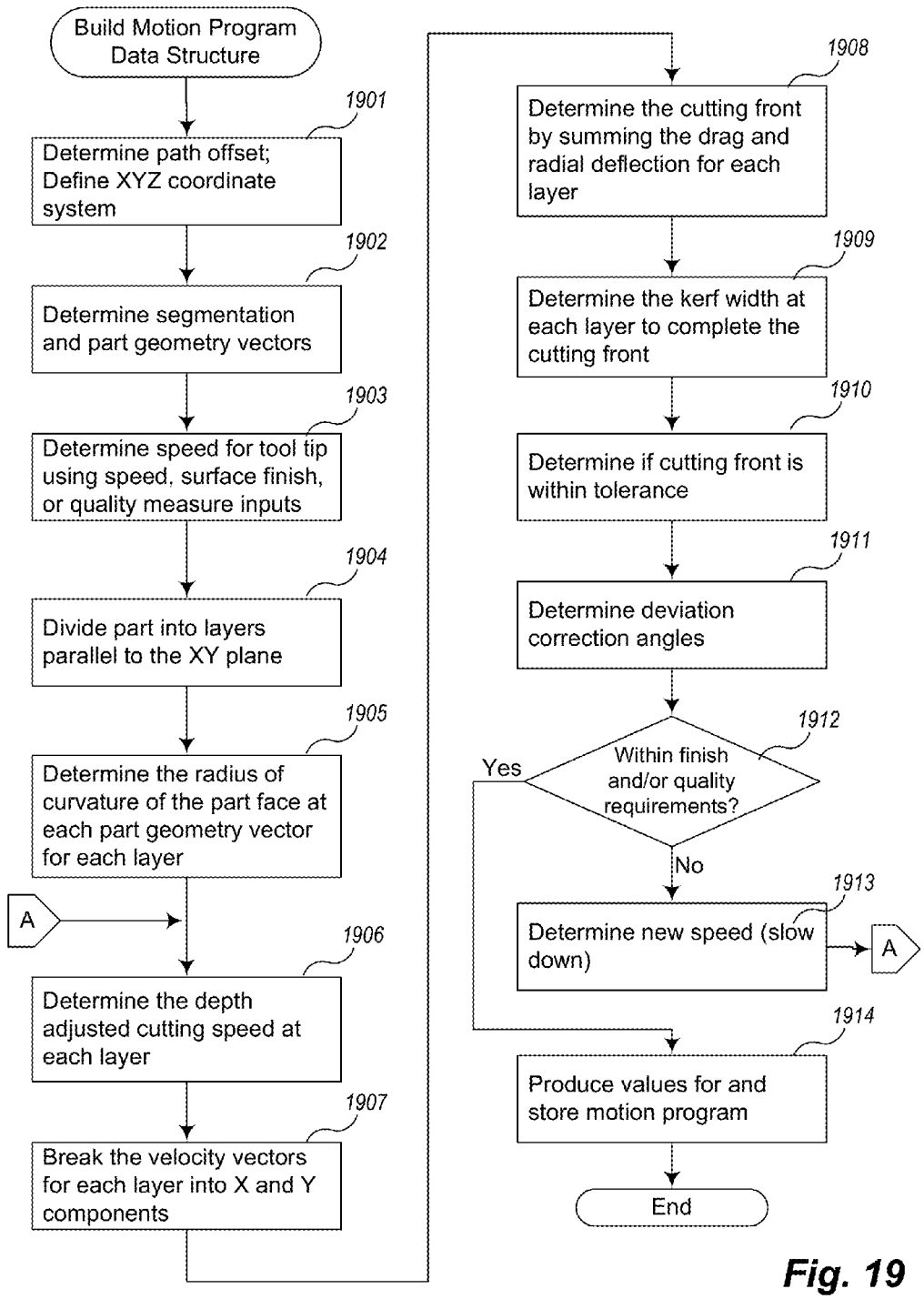
FIG. 19 is an example flow diagram of the process performed by an example AVCS to build a motion program data structure.

FIG. 19 is an example flow diagram of the logic performed by an example AVCS to build a motion program data structure. This logic is invoked, for example, from block 1803 of FIG. 18. The AVCS examines the geometry specification that was received for the desired part and automatically determines and adjusts, using the models (such as the models 505 of FIG. 5) and overriding cutting process parameter values indicated by the operator, the speeds and orientation of the jet to be used to cut the target piece according to the specified customer requirements. These values are stored in a data structure that forms the motion program when it is complete. Any appropriate data structure, including a simple array, file, or table, may be used to store the motion program data. Moreover, as explained above the motion program data structure may include code, instructions, data, and/or other logic as appropriate to control the controller and/or cutting head.

Specifically, in block 1901 the AVCS automatically calculates an offset geometry for the desired part (called also the part geometry) from the inputted geometry specification as described elsewhere and assigns to it an XYZ coordinate system, upon which all subsequent calculations are based. Recall that the offset geometry is the geometry that needs to be followed when the target piece is cut to account for any width that the jet actually takes up when cutting. Preferably, a right-handed coordinate system is used with the Z-axis pointing upward. However, any consistent coordinate system may be used. In practice, the calculations are made easier if the coordinate system matches the physical robotic system on which the part will be cut.

In block 1902, the part geometry is automatically segmented such that it is represented as a series of part geometry vectors (PGVs). As described earlier, PGVs are straight line segments connecting a contour where the jet enters the material to be cut with a contour where the jet exits the material. Preferably, endpoints of the PGVs along the jet entrance and jet exit contours are connected by line segments, although other geometric entities such as arcs may be feasible in some control schemes. The jet entrance and jet exit contours are in a one-to-one relationship such that the two contours have the same number of segments. For ease of explanation, the flow diagram of FIG. 19 will refer to a part such as that represented in FIG. 7B, although the techniques are not limited to geometries (such as FIG. 7B) where the jet enters a surface co-planar with the surface where the jet exits. Note that the techniques described in FIG. 19 may be applied to any geometry, provided the proper transformations are applied to the selected coordinate system.

In block 1903, the AVCS determines a tool tip speed (e.g., in units of percent speed) for each segment of the jet exit contour (between two PGVs). In other embodiments, indications of speed other than units of percent speed may be incorporated. For the sake of consistency and ease, units of percent speed are used herein to describe speed. The tool tip speed is determined automatically by the AVCS using the part geometry and the indication of maximum cutting speed allowed by the operator as was explained with reference to FIG. 6. In its simplest form, in one embodiment, the AVCS follows a highly conservative approach and allows no part of the cutting jet stream to exceed the speed determined by the AVCS. For example, in the case where an operator uses an indicator of 50% maximum speed. If the length of the connecting segment between two PGVs is the same at both the jet entrance (along the jet entrance contour) and exit of the part (along the jet exit contour), then the AVCS will calculate the cutting speed based on the 50% input. If, however, the length of the connecting segment at jet entrance is twice as long as the length of the connecting segment at jet exit, then a conservative approach is to use a 50% value at the entrance of the cut, even if the cutting speed is very slow along the jet length at the exit of the cut. (FIG. 3B shows a tapered bevel part where the entrance contour is longer than the exit contour.) If the length of the connecting segment at jet entrance is half the length of the connecting segment at jet exit, then a conservative approach is to lower the entrance cutting speed to a speed determined by a 25% value (half the 50% maximum value). (FIG. 3A shows a beveled part where the entrance contour is shorter than the exit contour even though the shapes are the same. See as well FIG. 21.) Setting the entrance cutting speed to a 25% value guarantees that no portion of the cut surface is cut faster than the 50% originally assigned by the operator. Less conservative approaches can be used based on predictive models such as those, for example, describing surface finish as a function of cutting speed. Any type of predictive model can be used by the AVCS, as well as look-up tables, or simple mathematical techniques such as averaging.

In block 1904, the AVCS automatically "slices" the part geometry into many layers parallel to the XY-plane. The AVCS will automatically apply predictive models, (e.g., the adaptive deviation correction model 506 of FIG. 5) to each slice to predict localized deviations such as trailback (drag), radial deflection, which may affect the drag, and taper. The drag results (accounting for any radial deflection) for each layer are then summed together to give an overall picture of the cutting front. Specifically, the deviation position at each layer becomes the starting position for the subsequent layer. Hence, by adding the relative deviations, a whole sense of the total deviation of the predicted cutting front from the desired cutting front can be determined. In addition, the taper is examined at each layer to determine whether the cut is within a localized tolerance volume. Once the predicted cutting front is determined and compared against acceptable tolerances, the AVCS can determine correction angles to be applied to the jet orientation to attempt to adjust the cutting front to come within acceptable tolerances as described with respect to FIG. 10 through FIG. 13.

Figure 20:
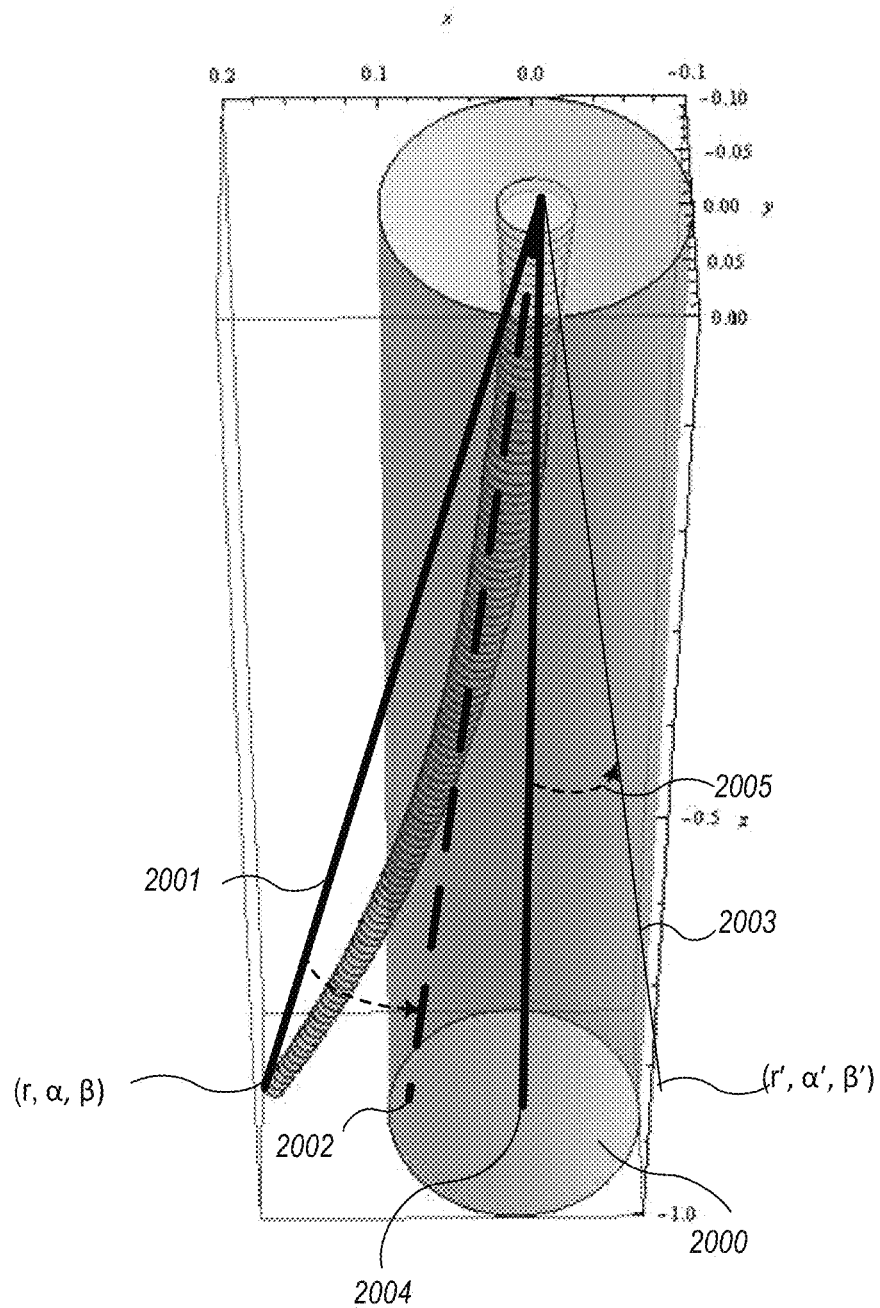
FIG. 20 is an example illustration of applying deviation correction angles to adjust jet orientation to be within acceptable tolerances.

For example, consider the scenario depicted in FIG. 20. FIG. 20 is an example illustration of applying deviation correction angles to adjust jet orientation to be within acceptable tolerances. In FIG. 20, line 2004 represents a PGV, the ideal desired location for the cutting front to produce the desired geometry. However, line 2001 shows the starting and exit locations of the predicted cutting front as summed up over multiple layers, where line 2001 falls outside of the desired tolerance volume 2000. Line 2002 shows the starting and end positions of a hypothetical cutting front that would fall within an acceptable tolerance volume. The AVCS calculates the appropriate rotations required to orient line 2001 to the position of 2002. These rotations become the correction angles 2005 applied to the PGV 2004. By adding these correction angles to the PGV, the cutting front will be shifted within the tolerance volume eventually when cutting takes place.

The thickness chosen for each layer is a trade-off between calculation effort and resolution. Thinner layers require more calculations but provide results that are more accurate. Thicker layers allow for fewer calculations but less accurate results. Experiments have shown that a layer thickness of 0.01 inches (0.254 mm) will describe a typical abrasive waterjet cut with adequate detail. The equations used in the following description are based upon this layer thickness. Coefficients for the various equations may vary as layer thickness is changed.

Figure 21:
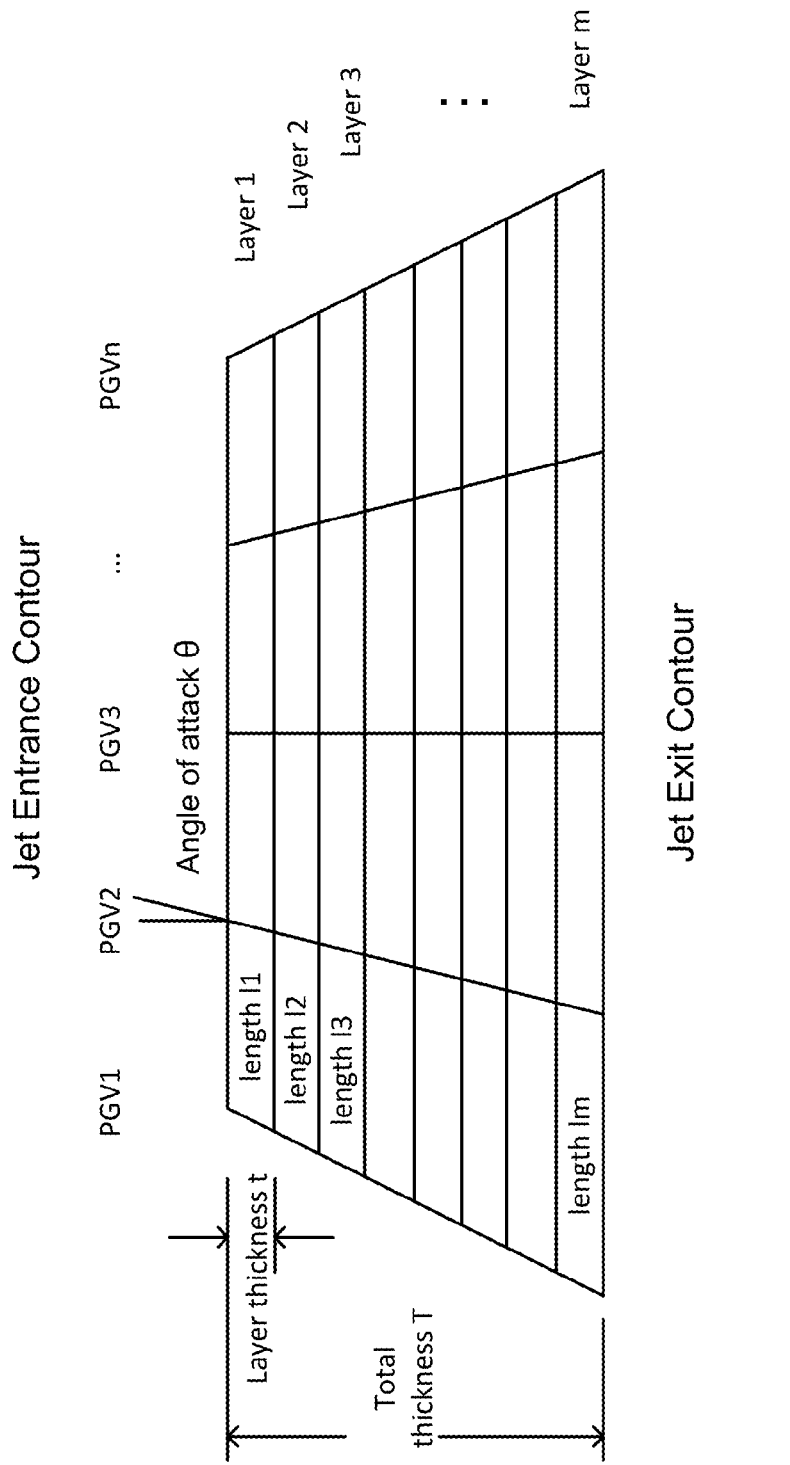
FIG. 21 shows an example of the side profile of a trapezoidal shaped part used to illustrate the segmentation and layering of an example AVCS.

FIG. 21 shows an example of the side profile of a trapezoidal shaped part used to illustrate the segmentation and layering of an example AVCS. FIG. 21 shows five PGVs and a total of m layers. In practice, the number of PGVs and layers may be much greater. The reduced number is shown for explanatory purposes. Each layer has a thickness t, with the total thickness of the part shown as T.

In block 1905, the radius of curvature of the part surface at each PGV (for each PGV segment) for each layer is determined. The radius of curvature R is the reciprocal of the curvature k of the part surface. Both the curvature k and the radius of curvature R are found using well established mathematical methods for surfaces. For example, Kobayashi and Nomizu, *Foundations of Differential Geometry*, John Wiley & Sons, 1991, or Thorpe, *Elementary Topics in Differential Geometry*, Springer-Verlag, N.Y., 1979 provides such information, and are incorporated herein by reference in their entireties. It is noted that information about the curvature may be lost through the segmentation process (e.g., when the PGVs are straight lines). In such cases, the curvature values can be retrieved from the original geometry that was input as the geometric specification. Alternatively, these values may be calculated as part of the logic of FIG. 19 prior to the segmentation. For example, in the part shown in FIG. 7B, the radius of curvature at each layer will vary from the radius of the circle that forms each segment at the jet entrance contour to a value of infinity for the line that represents each segment at the jet exit contour. The value for the radius on intermediate layers will vary as a function of the surface description.

Figure 22A:
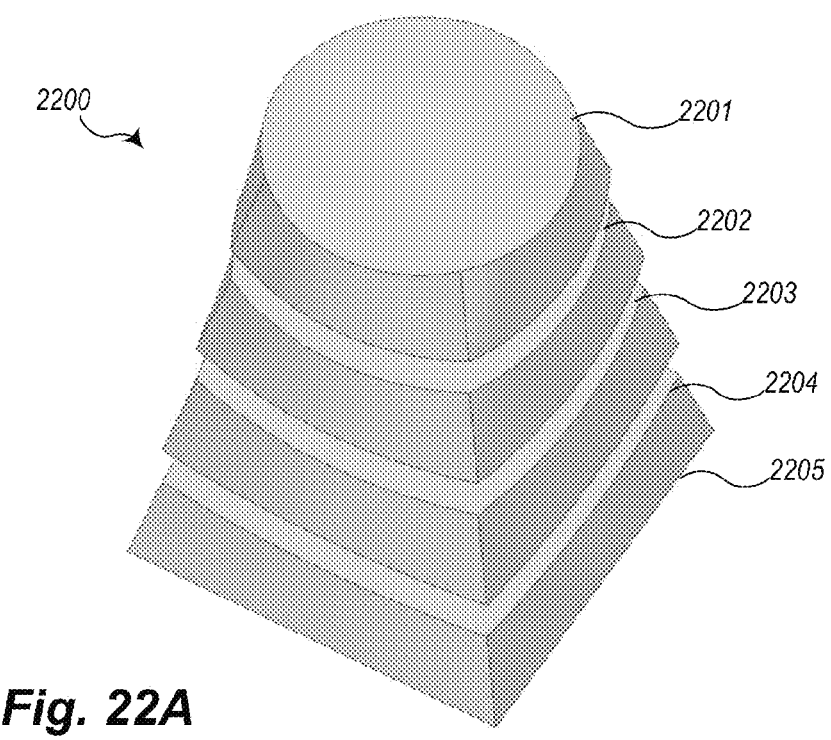
FIGS. 22A and 22B illustrate how the radius of curvature varies for each layer on a part such as that shown in FIG. 7B.
Figure 22B:
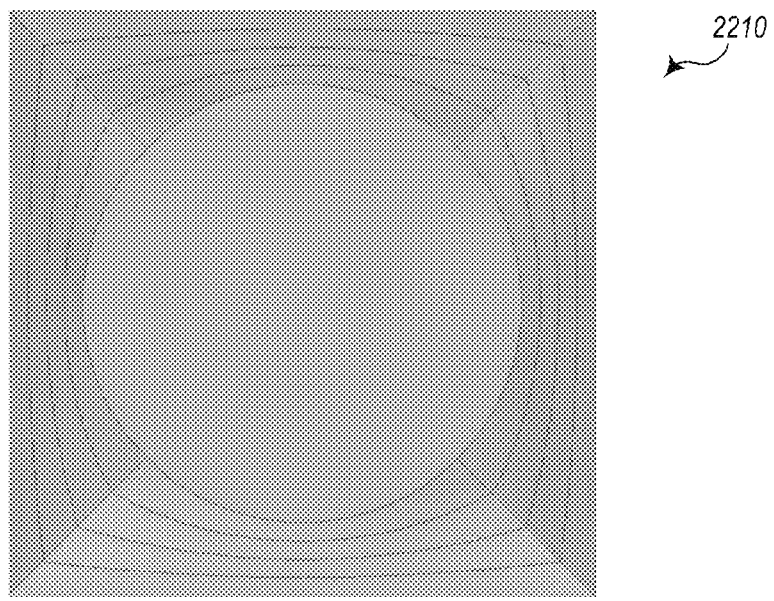

FIGS. 22A and 22B illustrate how the radius of curvature varies for each layer on a part such as that shown in FIG. 7B. FIG. 22A shows an exploded view with the part "sliced" into four layers. By examining the edges 2201, 2202, 2203, 2204, and 2205, the transition from circle at edge 2201 to line at edge 2205 is clearly seen. FIG. 22B shows a top view of the same part to give a different perspective of the same effect.

In block 1906, the AVCS calculates an adjusted cutting speed at each layer (e.g., an adjusted percent cutting speed) by using the (percent) speed of the jet exit contour and information from the PGVs and connecting segments. The adjustment in the speed accounts for the material depth at each layer. In other words, the speed assigned to the jet exit contour is associated with the total depth T of the material. But the AVCS preferably uses a cutting speed that is appropriate for a given layer to derive the other layer calculations. In addition, the angle of attack θ should be taken into account as well as the pivoting of the jet as it moves through the material. In FIG. 21 it can be seen that the angle of attack is taken into account to compensate for any additional distance the jet travels through a layer due to the angle θ. Also in FIG. 21, for example, the bottom segment lengths $L_m$ are greater than $L_{m-1}$ and so on. This effectively makes the cutting speeds towards the entrance of the cut even slower than at the bottom. If the entrance lengths were larger than at the exit, the effect is reversed. Additionally, cutting efficiency tends to decrease with depth because of power loss down the jet length and this too is preferably taken into account. With regards to the decrease in cutting efficiency with depth, based upon empirical results, for materials up to 2-inches thick, the cutting speed is approximately proportional to (1−0.2T)/T where T is the total thickness in inches. This relationship is used to calculate the adjusted cutting speed per layer by forming a ratio of the proportional cutting speed at the full material thickness to the proportional cutting speed at the thickness of a given layer.

Equation (1) shows the form of equation used to adjust the cutting speed for each layer (here using percent speed as a measure of speed). In Equation (1), $U_{\%\ adj}$ is the adjusted speed in percent for a given layer, $U_{\%\ exit}$ is the percent speed at the exit contour, T is the total thickness of the target material in inches, t is the depth of one layer in inches, m is the layer number counting from the entrance contour, $L_{exit}$ is the length of the segment in inches connecting two adjacent PGVs at the exit contour, $L_m$ is the length of the segment between adjacent PGVs of the layer being adjusted. Equation (1) has been shown to work well for material depths up to 2-inches thick. For materials thicker, some adjustment of coefficients may be necessary.

$$U_{\%\ adj} = \left(\frac{L_m}{L_{exit}}\right) * U_{\%\ exit} * \frac{\left(\frac{1-0.2T}{T}\right)}{\left(\frac{1-0.2mt}{mt}\right)} \quad (1)$$

In block 1907, the adjusted (percent) cutting speed for each layer is broken into X and Y components to represent a directional component. Starting with the first PGV, the direction of the segment at each layer connecting to the following PGV forms a velocity vector. Following standard rules of geometry, the AVCS calculates the adjusted percent speed for each layer for both the X and Y components of the established coordinate system. Results of the calculations are stored in a suitable data structure.

In block 1908, the AVCS constructs the three dimensional profile of the cutting front. To calculate the cutting front for each layer, the AVCS takes two interactions between the jet and the material into account. The first interaction is the deflection of the jet opposite from the direction of the cut. This is referred to as jet drag, trail-back, or lag. The AVCS calculates the drag for each layer in each of the X and Y components using an equation in the form:

$$d_{L'} = \frac{\left(0.41 * \left(\frac{t}{\cos\theta}\right) * U_{\%\ adjxy}\right)}{100} \quad (2)$$

where $d_{L'}$ is the computed drag length in inches for each of the X and Y components of the total drag $d_L$ for a given layer, θ is the number of degrees in the angle of attack of the PGV into the material layers as shown in FIG. 21, $U_{\%\ adjxy}$ is the X or Y component of the adjusted percent speed for a given layer found by Equation (1), and t is the thickness of the layer in inches. The total drag length $d_L$ is the sum of its vector components. The angle of attack must be less than 90 degrees. In practice, angles of attack approaching 90 degrees are not allowed and Equation (2) becomes less accurate at larger angles of attack. The second interaction occurs when cutting a circular shape. In this case, the combination of the drag and circular motion create a cutting front that does not purely oppose the direction of the cut, but has a component perpendicular to the cutting direction towards the center of the circular move.

Figure 23:
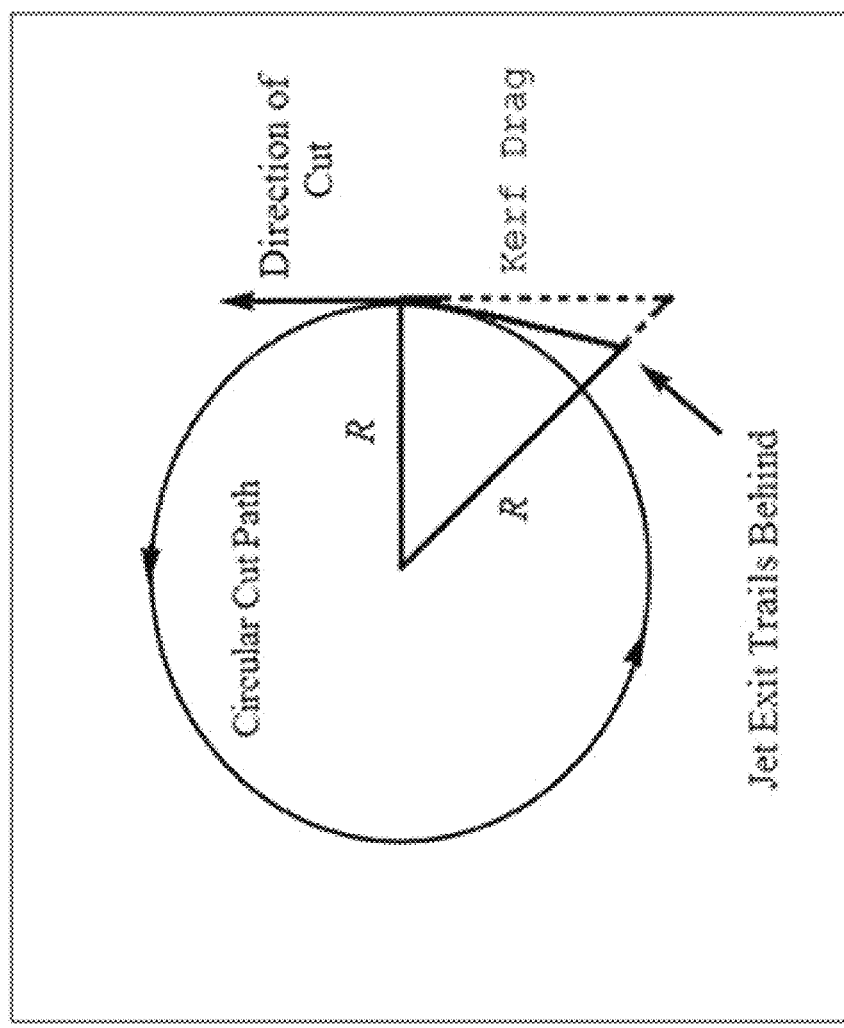
FIG. 23 shows the deflection of the trailing kerf towards the center of the circular move.

FIG. 23 shows the example deflection of a trailing kerf towards the center of the circular move. The kerf is the cut created by the tool. The AVCS calculates this perpendicular component using an equation of the form:

$$d_R = 30.0 \cdot ((R^2 + d_L^2)^{1/2} - R) \quad (3)$$

where $d_R$ is the distance in inches perpendicular to $d_L$, and R is the radius of curvature in inches for each layer. When the AVCS encounters a line, the value of $d_R$ is simply set to zero. Because each layer has a finite thickness, it is possible that the radius of curvature at the top of the layer is different than that at the bottom. In such cases the average radius of curvature may be used. The AVCS starts at the first layer where the jet enters the material and calculates the X and Y components of the drag. The segment between two adjacent PGVs defines the direction of the cut and thus the direction of the drag. When a value for the radius of curvature exists, the value of $d_R$ is calculated based on the vector sum of the X and Y components for $d_L$. The location of the jet drag position is shifted perpendicular to its original direction and by the amount of $d_R$. The location of the combined drag and radial deflection moves define the starting point for the next layer. The AVCS then sequentially calculates the drag and circular deflection layer by layer until the entire profile of jet curvature is constructed. Calculated values for each layer are stored in a suitable data structure. In FIG. 10, the general curved shape of the cutting front 1002 is an example of the shape created by a combination of drag and radial deflection.

Figure 24:
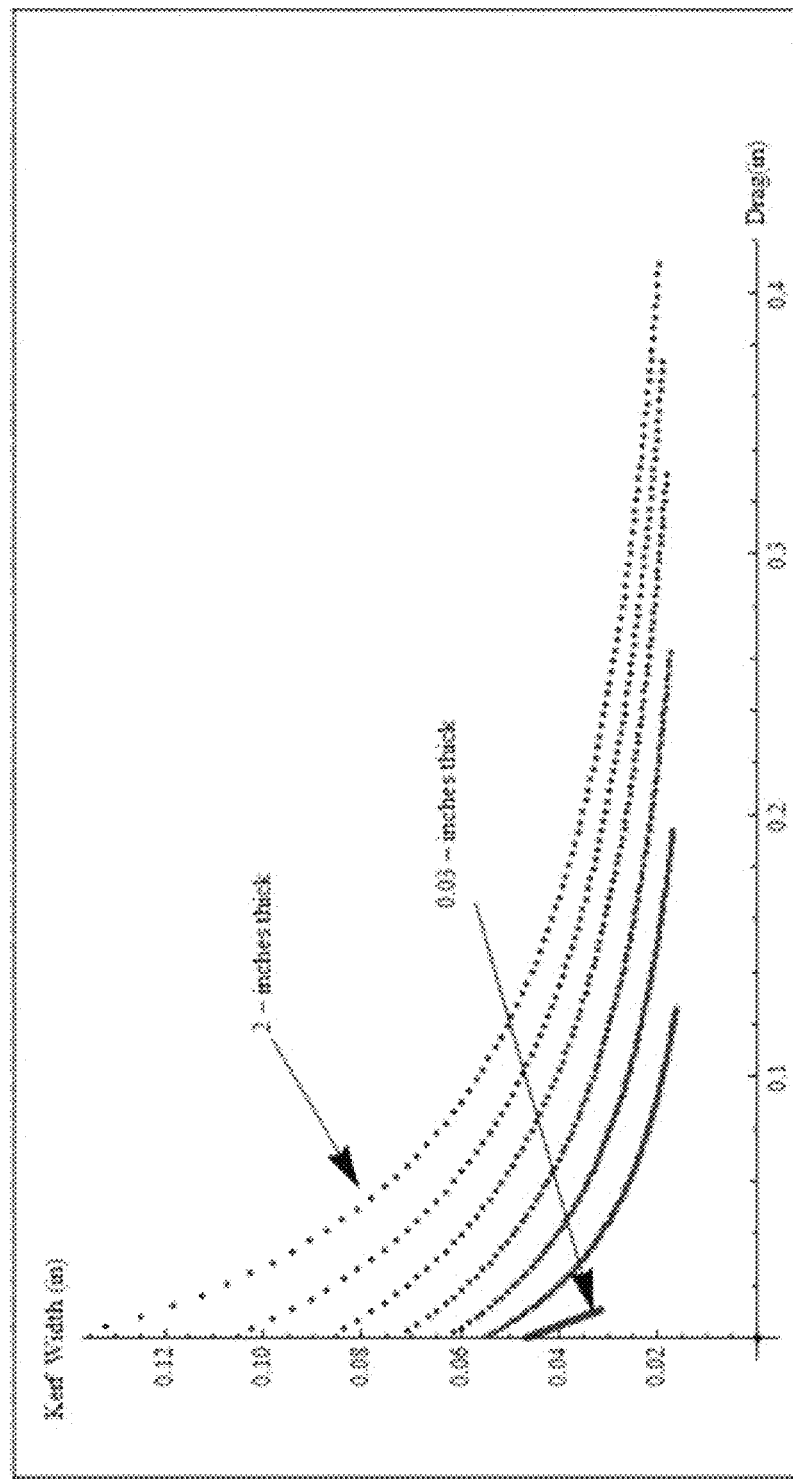
FIG. 24 shows a graphical representation of the relationship between kerf width and linear drag.

In block 1909, the AVCS determines the width of the kerf at each layer. For this block, the AVCS relies on models showing the macro structure of the jet. Existing models for kerf width and drag are known in the art and, for example, one form is presented in U.S. Pat. No. 6,766,216. In these models it is seen that both drag and width of the kerf are functions of material thickness and percent speed. Thus, kerf width may be calculated using the relationship between linear drag and kerf width. FIG. 24 shows a graphical representation of the relationship between kerf width and linear drag. In particular, each line on the graph represents how the kerf width, for pairs of percent speed and material thickness, varies with different linear drag values. The AVCS examines the stored data for each layer and calculates the total length of the drag for each layer (from entrance to and including that layer), without regard to the radial deflection. The value of this drag is then used to calculate what an equivalent percent speed would be in a linear cut for which the kerf width is predicted using the aforementioned models. The linear equivalent percent speed $U_{L\%}$ is found using equations of the form:

If mt≤0.25 then $$U_{L\%} = \frac{(100 \cdot d_{LS})}{(0.36 \cdot mt)} \quad (4)$$

If mt≥0.25 and mt≤2.0 then $$U_{L\%} = \frac{(100 \cdot d_{LS})}{((0.1445 \cdot mt) + 0.0539)} \quad (5)$$

where mt is the product of the layer number m and layer thickness t in inches representing the current layer depth, and $d_{LS}$ is the total drag at that depth. Calculated values for each layer are stored in a suitable data structure.

The AVCS then uses the value of $U_L\%$ to calculate the width $W_L$ in inches of each layer using equations of the form:

If mt≤0.25 then $$W_L = (0.051389 - (0.000131 \cdot U_{L\%}) - (0.172999 \cdot mt) + (0.588475 \cdot (mt)^2) - (0.000721 \cdot U_{L\%} \cdot mt)) \quad (6)$$

If mt>0.25 and mt≤2.0 then $$W_L = (20.391548 + (0.434775 \cdot U_{L\%}) - (4.650149 \cdot mt))^{-1} \quad (7)$$

The AVCS stores calculated values for each layer in a suitable data structure. FIG. 10 shows a representation of the cutting front where the kerf width of each layer is represented by a disk centered around the cutting front shape determined by the drag and deflection calculations of block 1908.

In block 1910, the AVCS automatically determines if the cutting front, i.e., the curvature characteristics of the intended cut, is within the deviation tolerance(s) allowed. Using the tolerance input (by the operator, AVCS itself, and/or by an external input), the AVCS calculates the acceptable tolerance volume around each PGV per layer. (For example, consider the cylinder representing the tolerance volume in FIGS. 10-13.) The cutting front data for each layer determined in block 1909 is then checked to see if the intended kerf will be within the acceptable volume. If the cutting front is acceptable for all layers of that PGV, the next PGV and cutting front (curvature characteristics of the intended cut at that path profile) are checked for each layer. For each PGV, the results of the tolerance checks are stored in a suitable data structure.

Figure 25:
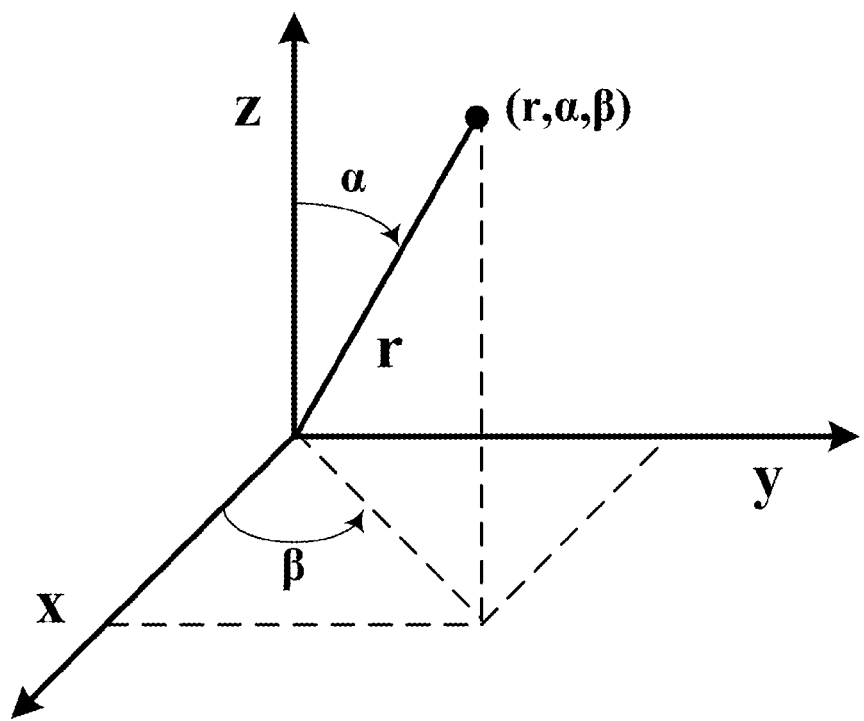
FIG. 25 shows an example of the use of spherical coordinates to derive deviation correction angles.

In block 1911, the AVCS locates any PGVs for which the corresponding cutting front is (cut curvature characteristics are) out of tolerance. An example of this situation was described with reference to FIG. 20. A line 2001 represents an imaginary line connecting the top layer kerf location to the bottom layer kerf location. One convenient way to describe the position and orientation of 2001 is to use a local spherical coordinate system with the origin placed at the top of the PGV 2004. FIG. 25 shows an example of the use of spherical coordinates to derive deviation correction angles. Using spherical coordinates, any point in space can be defined by two angles and a distance from an origin. Applying this method to FIG. 20, it can be observed that the location of the cutting front at the bottom layer is defined by a length r, and two angles α and β. The line 2002 represents any orientation that would allow the cutting front to lie within the tolerance volume 2000. That is, if line 2001 were rotated to the position of line 2002, the predicted cutting front would no longer extend outside of the tolerance volume 2000. Since the bottom endpoint of line 2002 may also be defined by spherical coordinates, standard mathematical procedures for rotation transformations may be used to calculate values for angles that, when applied to line 2001, will rotate it into position shown by line 2002. These calculated angles may effectively be used to correct for the deviation of the cutting front from the PGV 2004. The dotted line 2005 shows that by applying these deviation correction angles to the PGV 2004, the (jet direction vector) JDV 2003 is obtained. Again, rotating the PGV by the amount of the deviation correction angles can be performed using known mathematical procedures for rotation transformations.

In block 1912, the AVCS determines if the deviation corrected cutting front is still within the deviation tolerance volume. If not, the AVCS continues to block 1913 to lower the cutting speed by some chosen percent speed and the cutting front recalculated from the beginning by returning to block 1906. This process is iterated upon (performing blocks 1906 through 1913) until the cutting front fits within the deviation tolerance volume, for example, as shown in FIG. 14.

In one embodiment, the AVCS does not allow the speed to go below a fixed value. If this value is reached, the operator is notified that the desired tolerance will not be met. Lowering the cutting speed for one PGV may necessitate an adjustment of the cutting speeds for speeds of adjacent PGVs (or JDVs). This may be necessary if machine acceleration limits are violated or to avoid large speed changes that affect the cut part appearance. Generally speaking, speed changes that result in a large drag change in a short distance are discouraged. If several speeds need to be adjusted, the AVCS iterates over the affected area. All results are stored in a suitable data structure.

In block 1914, the AVCS produces the actual motion instructions (e.g., in a motion program and/or data) and stores them. The motion instructions contain all of the information necessary for the motion controller to move the tool tip along the jet entrance contour at the proper speed and in the proper orientations aligning with each JDV. The information for all PGVs, speed indications (e.g., percent speeds), and deviation correction angles are retrieved. Where needed, the speed indications (e.g., percent speeds) are converted into real speed units if needed using suitable predictive models or look up tables. These models are practiced, for example, in the FlowMaster software. As appropriate for the cutting head controller, the commands necessary to move the motors to achieve the position and orientation of the cutting head along the PGVs plus deviation correction angles are calculated and a motion program/data built from them.

The motion program may be written in any format that is understood by a given motion controller. For example, one common form of motion program uses what is commonly referred to as G-code. A simple example of a G-code program is:

G01X10F50 where the G01 indicates a linear move 10 units in the X-direction at a speed of 50 units per time. More complex G-code commands would include Y and Z directions, as well as commands for rotary axes. The actual values used for the X, Y, Z, F, and rotary commands will depend on whether or not the tool tip position and orientation is being commanded or the explicit motor positions needed to produce the desired tip position and orientation.

In another embodiment of FIG. 19, the AVCS does not perform one or more of the logic blocks. Instead, the models, such as the adaptive deviation correction model (model 506 in FIG. 5) are downloaded into the controller itself. As the controller executes the cutting path profile of the part geometry, the controller consults internally embedded models and feedback relative to the current location in the cutting path profile and the upcoming location to determine any needed deviation correction angles to be used to adjust the jet, for example, by manipulating the cutting head orientation. Thus, a type of "look-ahead" is provided. As discussed with reference to FIG. 26 below, once the controller feedback and control screen is displayed (FIG. 16), an operator preferably selects the cycle start button (see e.g., button 1604) to cause the jet apparatus to actually begin cutting the workpiece.

Figure 26:
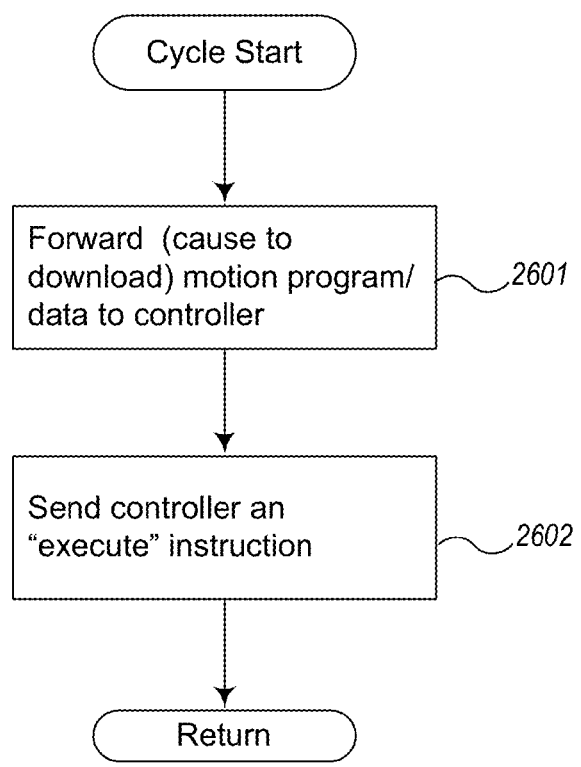
FIG. 26 is an example flow diagram of the steps performed by the Adaptive Vector Control System to begin the cutting cycle.

FIG. 26 is an example flow diagram of the logic performed by the Adaptive Vector Control System to begin the cutting cycle. In block 2601, the AVCS forwards (e.g., causes to be downloaded, sends, transmits) the motion program to the controller (e.g., controller computer or card). In block 2602, the AVCS sends or otherwise communicates an instruction to the controller to indicate that the controller should begin executing the motion program, and then returns. As the controller advances through the motion program, it smoothly transitions between all angles and speeds.

All of the above U.S. patents, U.S. patent application publications, U.S. patent applications, foreign patents, foreign patent applications and non-patent publications referred to in this specification and/or listed in the Application Data Sheet, including but not limited to U.S. Pat. No. 6,766,216, entitled "METHOD AND SYSTEM FOR AUTOMATED SOFTWARE CONTROL OF WATERJET ORIENTATION PARAMETERS," issued Jul. 20, 2004; U.S. Pat. No. 6,996,452, of the same title, issued Feb. 7, 2006; and U.S. Pat. No. 8,423,172, entitled "AUTOMATED DETERMINATION OF JET ORIENTATION PARAMETERS IN THREE-DIMENSIONAL FLUID JET CUTTING," issued on Apr. 16, 2013 are incorporated herein by reference, in their entireties.

From the foregoing it will be appreciated that, although specific embodiments have been described herein for purposes of illustration, various modifications may be made without deviating from the spirit and scope of the present disclosure. For example, the methods, systems, and techniques for automatically determining and adjusting deviation correction angles discussed herein are applicable to other architectures other than a PMAC controller architecture. Also, the methods, systems. and techniques discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method in a fluid jet apparatus control system for automatically determining and generating motion instructions to control a fluid jet cutting head to cut a three dimensional target part within one or more designated tolerances using a fluid jet, comprising:
   receiving an indication of a geometry of the three dimensional target part, the geometry indicative of a jet entrance contour that is not the same as a jet exit contour, such that the fluid jet, when cutting, cuts the jet entrance contour and the jet exit contour from a workpiece in at least one of different speeds or in different directions;
   receiving an indication of at least one of a desired surface finish, quality, or speed;
   automatically determining, by examining at least one of speed or direction changes at a plurality of points along the depth of the intended cut of the jet through the workpiece determined from a point on the jet entrance contour to a point on the jet exit contour, whether the examined speed of direction changes at the plurality of points predicts an intended cut that has three dimensional curvature characteristics that are outside the designated tolerances when the target part is cut at speeds corresponding to the indicated desired surface finish, quality, or speed;
   when determined that the intended cut has three dimensional cut curvature characteristics outside the designated tolerances, automatically determining deviation correction angles to adjust orientation of the jet to produce a cut having three dimensional curvature characteristics that are within the designated tolerances; and automatically generating and storing one or more motion instructions or data that indicate desired movement of the cutting head, taking into account the determined deviation correction angles to adjust orientation of the jet.

2. The method of claim 1 wherein the automatically determining whether the examined speed or direction changes at the plurality of points predicts an intended cut that has three dimensional curvature characteristics that are outside the designated tolerances by examining at least one of speed or direction changes at the plurality of points along the depth of the intended cut of the jet determines at least one of a non-linear trailback or radial deflection at that plurality of points along the depth of the intended cut of the jet.

3. The method of claim 1 wherein the automatically determining whether the examined speed or direction changes at the plurality of points predicts an intended cut that has three dimensional curvature characteristics that are outside the designated tolerances by examining at least one of speed or direction changes at the plurality of points along the depth of the intended cut of the jet, further comprises:
determining a predicted cutting front of the intended cut; and
comparing the predicted cutting front to a designated tolerance volume to determine whether the intended cut has three dimensional curvature characteristics that are outside the designated tolerances.

4. The method of claim 1 wherein the three dimensional curvature characteristics include one or more of trailback or radial deflection.

5. The method of claim 1 wherein the three dimensional curvature characteristics include kerf width.

6. The method of claim 1 wherein the designated tolerances can be expressed as designated volumes surrounding the depth of the intended cut from one or more points on the jet entrance contour to corresponding points on the jet exit contour.

7. The method of claim 1, further comprising communicating at least one of the one or more motion instructions or data that include the orientation adjustments to the cutting head to control the cutting process.

8. The method of claim 1 wherein the one or more motion instructions or data include the deviation correction angles or comparable inverse kinematic values.

9. The method of claim 1 wherein the deviation correction angles are used to adjust orientation of the jet control the tilt and swivel positions of the cutting head.

10. The method of claim 1 wherein the fluid jet apparatus control system is an abrasive water jet system.

11. The method of claim 1 wherein the receiving an indication of the geometry of the three dimensional target part indicates a target part with differing contours, each contour having a different radius of curvature, progressively from the jet entrance contour to the jet exit contour of the part.

12. The method of claim 1, further comprising forwarding the at least one of the one or more motion instructions or data to a controller.

13. A non-transitory computer-readable medium having instructions that, when executed, control a computer processor to automatically determine and generate motion instructions for use with controlling a waterjet cutting head to cut a three dimensional part with one or more designated tolerances, by performing a method comprising:

receiving an indication of a geometry of the three dimensional target part, the geometry indicative of a jet entrance contour that is not the same as a jet exit contour, such that the fluid jet, when cutting, cuts the jet entrance contour and the jet exit contour from a workpiece in at least one of different speeds or in different directions;

automatically determining at least one predicted cutting front that corresponds to the intended cut of the jet, by examining at least one of speed or direction changes at a plurality of points along the depth of the intended cut of the jet through the workpiece determined from a point on the jet entrance contour to a corresponding point on the jet exit contour;

comparing the predicted cutting front against a designated tolerance volume that surrounds the point along the jet entrance contour towards the corresponding point on the jet exit contour;

when at least some portion of the predicted cutting front is outside of the designated tolerance volume, providing adjustments to the orientation of the jet to incorporate deviation correction angles that would bring the predicted cutting front within the designated tolerance volume; and forwarding the adjustments to be included in at least one of a motion program, instructions, or data used to control the waterjet cutting head.

14. The computer-readable medium of claim 13 wherein the computer-readable medium is a computer memory.

15. The computer-readable medium of claim 13, wherein the three dimensional curvature characteristics include at least one of trailback or radial deflection.

16. The computer-readable medium of claim 13 wherein the three curvature characteristics include kerf width.

17. The computer-readable medium of claim 13 wherein the automatically determining at least one predicted cutting front that corresponds to the intended cut of the jet and the comparing the predicted cutting front against a designated tolerance volume is performed by integrating a predicted non-linear trailback or radial deflection over a plurality of small steps.

18. A computing system comprising:
a memory;
a computer processor;
a fluid jet cutting head control system that controls position and orientation of a cutting head to cut a three dimensional target part from a workpiece within one or more designated tolerances using a fluid jet;
predictive modeling logic, stored in the memory, that is configured, when executed on the computer processor, to:
determine at least one predicted cutting front that corresponds to the intended cut of the fluid jet, by examining at least one of speed or direction changes at a plurality of points along the depth of the intended cut of the jet through the workpiece determined from a point on a jet entrance contour to a point on a corresponding jet exit contour;
compare the predicted cutting front against the one or more designated tolerances to determine when at least some portion of the at least one predicted cutting front is outside of the one or more designated tolerances; and
provide deviation correction angles that will adjust three dimensional orientation of the jet to bring the predicted cutting front within the one or more designated tolerances; and motion instruction generation logic that constructs motion instructions for the fluid jet cutting head control system to control the orientation of the cutting head to cut the three dimensional target part based upon the provided deviation correction angles.

19. The computing system of claim 18 wherein the fluid jet cutting head control system is a CNC controller.

20. The computing system of claim 18 wherein the fluid jet cutting head control system is a robotics-based control system.

21. The computing system of claim 18 wherein the fluid jet cutting head control system is an integrated circuit board.

22. The computing system of claim 18 wherein the generated motion instructions are contained in a motion program or motion data used to drive the fluid jet cutting head control system.

23. The computing system of claim 18 wherein the predictive modeling logic operates by integrating information about cutting the three dimensional target part over a plurality of small steps to generate the at least one predicted cutting front.

* * * * *

UNITED STATES PATENT AND TRADEMARK OFFICE
CERTIFICATE OF CORRECTION

PATENT NO. : 9,597,772 B2
APPLICATION NO. : 13/802085
DATED : March 21, 2017
INVENTOR(S) : Glenn A. Erichsen et al.

Page 1 of 1

It is certified that error appears in the above-identified patent and that said Letters Patent is hereby corrected as shown below:

In the Claims

In Column 24, Line 59 (Claim 1), delete the first occurrence of "of" and substitute therefor --or--.

In Column 25, Line 16 (Claim 2), delete "that" and substitute therefor --the--.

Signed and Sealed this
Twenty-third Day of May, 2017

Michelle K. Lee
*Director of the United States Patent and Trademark Office*